US012279190B1

(12) United States Patent
Zhang et al.

(10) Patent No.: US 12,279,190 B1
(45) Date of Patent: Apr. 15, 2025

(54) RESPIRATION MONITORING BASED ON NOISY CHANNEL STATE INFORMATION (CSI) DATA

(71) Applicant: Amazon Technologies, Inc., Seattle, WA (US)

(72) Inventors: Feng Zhang, Sunnyvale, CA (US); Xiaofu Ma, San Mateo, CA (US); Piyush Tayal, San Fransisco, CA (US); Cong Phuoc Huynh, Palo Alto, CA (US); Xi Chen, San Jose, CA (US); Mohammed Rana Basheer, Costa Mesa, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 17/853,641

(22) Filed: Jun. 29, 2022

(51) Int. Cl.
| | |
|---|---|
| *H04W 4/38* | (2018.01) |
| *H04B 7/06* | (2006.01) |
| *H04B 17/336* | (2015.01) |
| *H04W 4/021* | (2018.01) |
| *H04W 52/52* | (2009.01) |
| *H04W 84/12* | (2009.01) |

(52) U.S. Cl.
CPC ............ *H04W 4/38* (2018.02); *H04B 7/0626* (2013.01); *H04B 17/336* (2015.01); *H04W 4/021* (2013.01); *H04W 52/52* (2013.01); *H04W 84/12* (2013.01)

(58) Field of Classification Search
CPC ....... H04W 4/38; H04W 4/021; H04W 52/52; H04W 84/12; H04B 17/336; H04B 7/0626

USPC .......................................................... 370/329
See application file for complete search history.

(56) References Cited

U.S. PATENT DOCUMENTS

| | | | | |
|---|---|---|---|---|
| 2021/0215789 A1* | 7/2021 | Hu | ........................ | G01S 7/415 |
| 2024/0064691 A1* | 2/2024 | Hu | ....................... | G01S 13/003 |
| 2024/0284229 A1* | 8/2024 | Yao | .......................... | H04L 5/00 |

(Continued)

OTHER PUBLICATIONS

Gu, WiFi-based Real-time Breathing and Heart Rate Monitoring during Sleep, 2019 IEEE Globecom, Dec. 9, 2019 (Year: 2019).*

(Continued)

*Primary Examiner* — Nicholas R Taylor
*Assistant Examiner* — Chong G Kim
(74) *Attorney, Agent, or Firm* — Lowenstein Sandler LLP

(57) ABSTRACT

Technologies directed to respiration monitoring based on noise channel state information (CSI) data are described. A method includes receiving CSI data representing channel properties of a wireless channel used by a first wireless device and a second wireless device located in a geographical region. The method generates a set of CSI samples by sampling the CSI data and removes one or more outlier CSI samples using a sparse outlier process, and removes a cluster of outlier samples using a cluster outlier process. The method determines Fast Fourier Transform (FFT) data for each channel subcarrier index and a signal-to-noise ratio (SNR) value for each channel subcarrier index, and identifies a first number of channel subcarrier indexes having highest SNR values to obtain a subset of FFT data, which represents a breathing spectrum. The method determines a respiratory rate of a user in the geographical region from the subset of the FFT data.

20 Claims, 22 Drawing Sheets

(56) References Cited

U.S. PATENT DOCUMENTS

2024/0373254 A1* 11/2024 Yao ..................... H04W 24/02

OTHER PUBLICATIONS

Joudeh, WiFi Channel State Information-Based Recognition of Sitting-Down and Standing-Up Activities, 2019 IEEE MeMeA, Jun. 26, 2019 (Year: 2019).*

Ma, WiFi Sensing with Channel State Information: A Survey, ACM Comput. Surv., vol. 52, No. 3, Article 46, Jun. 2019 (Year: 2019).*

* cited by examiner

RESPIRATION MONITORING BASED ON NOISY CHANNEL STATE INFORMATION (CSI) DATA

BACKGROUND

Many buildings, such as homes, retail stores, business centers, and the like, have a growing number of wireless transmission devices, including wireless transmitters and wireless receivers. These devices send an increasing amount of radio frequency (RF) energy through the buildings from many different directions. Wireless RF signals may be used in motion detectors to help detect human presence.

BRIEF DESCRIPTION OF DRAWINGS

The present embodiments will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1A:
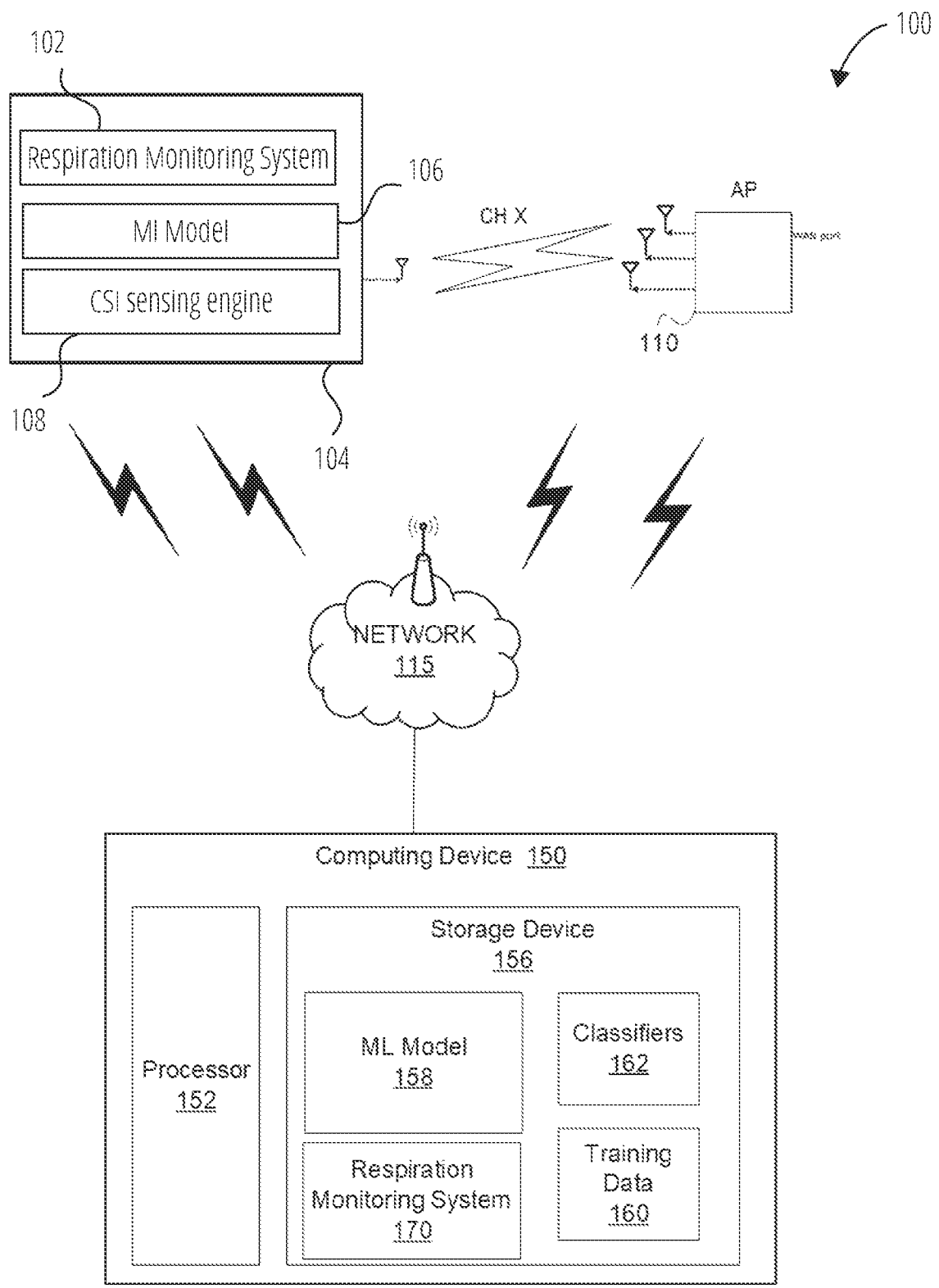
FIG. 1A is a block diagram of a system including a wireless detector with a Channel State Information (CSI) sensing engine for improving respiration detection and monitoring of a human using wireless signals in a wireless local area network, according to at least one embodiment.

A motion detector (e.g., a wireless detector) is a wireless device that detects moving objects, particularly humans. A motion detector may be integrated as a component of a system that automatically performs a task or alerts a user of motion in an area or vicinity. Accordingly, motion detectors may form a security component, such as a burglar alarm system, automated lighting control, home control, energy efficiency, and other useful systems. A motion detector can be used to detect, monitor, and report a respiratory rate of a user in the area or vicinity. This type of motion detector can be considered a breathing rate estimator.

The presence detection performed by motion detectors may be based on a number of different possible technologies, including, for example, passive infrared (PIR), microwave, ultrasonic, tomographic, video camera software, and gesture detection. A tomographic motion detector may sense disturbances to radio waves that pass from node to node in a mesh network. More generally, wireless radio frequency (RF) signals (or simply "wireless signals") may be employed to not only detect presence within line of sight, such as in the same room or space, but also in the adjacent room(s) because wireless signals may pass through walls. These RF signals may be generated via a wireless local area network (WLAN) employing technology such as 2.4 GHz or 5.0 GHz Wi-Fi®, and the like, or a personal area network (PAN) employing technology such as Bluetooth®, Zig- Bee®, Zwave®, and the like. The use of wireless signals for presence detection may be an attractive option due to the ubiquity of wireless transceivers such as access point (AP) or base station devices present in so many buildings and homes.

Furthermore, the RF channel properties available through radio transmission channels may contain data that may be employed in machine learning techniques used to train, for example, a supervised machine learning (ML) model for presence classification. Examples of data that may carry RF channel properties include RSSI data, CSI data, or a combination of both, as will be discussed in more detail. Additional sources of signal characteristics, power, channel properties, or other channel information may also be employed, and therefore, RSSI and CSI are but a listing of understood and available forms of channel properties. RSSI is a measurement value of power present in received wireless signals, and contains a single value per packet. For example, RSSI can be measured as the radio frequency power level that a client device receives from an access point, such as a wireless router. RSSI may be a measurement of the energy observed at the antenna by a wireless physical layer (PHY) of the receiver used to receive a current Physical Layer Convergence Protocol (PLCP) Protocol Data Unit (PPDU) of the receiver. In a typical home WLAN, the client device generates the RSSI either based on the data frame received or the beacon from the AP. The RSSI fluctuates when the environment changes. Many factors can cause such changes: moving transmitter or receiver, moving objects nearby the AP or client, changing ambient noise level, etc. As opposed to the RSSI, a single value available per packet, the CSI data includes the detailed channel impulse response with both amplitude and phase information across all the Orthogonal frequency-division multiplexing (OFDM) subcarriers and is updated (at the maximum rate) every OFDM symbol. This provides more information about the environment under surveillance. Therefore, by using CSI data, better detection can be accomplished. For example, CSI data can distinguish whether a person is watching television (TV) or washing dishes. However, RSSI based method is not able to distinguish them.

CSI data is granular, real-time data on the amplitude and phase of each channel subcarrier between the WLAN transmitter and receiver. Raw CSI data, provided by the chipset, is fed to a signal-processing engine for noise reduction, signal transforms, and/or signal extraction. The current implementations take these processed CSI data and run it through a machine learning (ML) model to determine whether the environment has been disrupted to the point of perceiving motion. This ML model can be "tuned" to prioritize latency and accuracy/sensitivity, using hysteresis or applying a user-provided notification threshold.

CSI-based motion detectors do not require an "active transmitter" like a phone to be on a person in order to detect and track them. Rather, CSI-based motion detectors work based on disruption to the channel state information and multipath effects of WLAN transmission between APs, smart speakers, streaming devices, or the like. However, conventional solutions use dedicated networks or mesh networks for CSI package exchanges in the 5 GHz band to increase the range. However, some client devices depend on the AP for which operating band is selected (e.g., 2.4 or 5 GHZ) and what bandwidth is supported. Some client devices only support 2.4 GHz for cost and power consumption reasons. CSI-based motion detection in the 2.4 GHz band has three issues that affect CSI performance, including bandwidth limitations (e.g., 20 MHz bandwidth), interference, and congestion.

As mentioned above, CSI can be used to monitor a person's respiratory rate. Since the breathing motion is periodic, the CSI measurement also exhibits periodic patterns, and the respiratory rate can thus be estimated from these periodic patterns. CSI-based sensing turns any device equipped with the Wi-Fi® chipset into sensors, which enables many human activity recognition applications in a contactless and low-cost manner without any wearable sensors attached to users' bodies. The existing respiration monitoring solutions using Wi-Fi CSI only consider perfect/high-quality CSI scenarios, i.e., the CSI is measured at AP, which is equipped with a premium Wi-Fi® chipset. In the era of Internet of Things (IoT) devices, many smart home devices are equipped with low-cost radios, and thus only lesser quality or noisy CSI data can be obtained. The lower-quality CSI data suffers from a high packet-loss rate, large variations, and severe outliers. There are three factors in CSI quality for sensing, including (i) consistency, (ii) low variance, and (iii) low outliers. Consistency issues arise if the internal clock used in the Wi-Fi chipset has large drift, large variance indicates insignificant baseband signal sampling, and finally outliers are due to frequent mode switching. Low cost Wi-Fi chips usually adopt inferior internal clock and ADC (analog-to-digital converter)/DAC (digital-to-analog converter)/PA (power amplifier) compared with higher-cost chipsets, like AP-level chipsets.

Aspects and embodiments of the present disclosure can overcome these challenges and others by providing respiration monitoring with lesser quality or noisy CSI data. Aspects and embodiments of the present disclosure can be used in various applications, such as: 1) medical and health care (e.g., monitoring the daily activity pattern of the user for aging-in-place.; 2) livelihood detection or presence detection (e.g., detecting the presence of people near the IoT device for security purposes; and 3) sleep monitoring (e.g., assess the sleep quality from the motion and respiratory patterns.), using smart-home IoT devices, such as voice-assistant devices, tablets, or the like. Aspects and embodiments of the present disclosure can provide an end-to-end algorithm pipeline for a respiration monitoring system based on the lower-quality CSI data extracted from a lower-cost Wi-Fi® chipset. Aspects and embodiments of the present disclosure can provide outlier removal filters for both sparsely-distributed outliers and densely-distributed outliers of the noisy CSI measurement. Aspects and embodiments of the present disclosure can provide a set of features extracted from patterns of the breathing spectrum to boost the robustness and accuracy of the breathing rate estimator. Aspects and embodiments of the present disclosure can provide CSI-based respiration detection and respiration monitoring in the 2.4 GHz band, even with lower-cost radios in IoT devices. Aspects and embodiments of the present disclosure can provide CSI-based respiration detection and respiration monitoring in the 2.4 GHz band despite the congestion and interference in the 2.4 GHz band.

One method includes receiving first CSI data representing channel properties of a wireless channel used by a first wireless device and a second wireless device located in a geographical region, where the first wireless device and the second wireless device operate in a 2.4 GHz band. The geographical region can be a room within a home, multiple rooms within the home, an office, a room in a building, multiple rooms in the building, an outdoor region, or the like. The method further includes generating a first set of CSI samples by sampling the first CSI data, removing or adjusting one or more CSI samples of the first set of CSI samples using a sparse outlier process, and removing, if any, a cluster of outlier samples in the first set of CSI samples using a cluster outlier process, determining Fast Fourier Transform (FFT) data for each channel subcarrier index of a set of channel subcarrier indexes using the first set of CSI samples. The method further includes determining an SNR value for each channel subcarrier index of the set of channel subcarrier indexes, and identifying a specified number of channel subcarrier indexes having a highest SNR value, where the FFT data (e.g., FFT feature(s)) of the specified number of channel subcarrier indexes represent a breathing spectrum. The method further includes determining a respiratory rate of a user in the geographical region from the breathing spectrum.

In other embodiments, the channel properties may be present in data received within a communication link between the wireless detector, e.g., a first wireless device, and a wireless transmitter in an AP-type device, e.g., a second wireless device. The wireless detector may classify, by a processor of the wireless detector executing a supervised ML model, the first data to distinguish human movement within the building from stationary objects to detect the presence, motion, or no-motion of a human. The wireless detector may then output a signal indicative of the confirmed presence, motion, or no-motion of the human in the room of the building. The output signal may be adapted to turn off the lights, signal a security system, or adjust a thermostat associated with the room in the building.

FIG. 1A is a block diagram of a system 100 including a wireless detector 104 with a CSI sensing engine 108 for improving respiration detection and monitoring of a human using wireless signals in a wireless local area network in the 2.4 GHz band, according to at least one embodiment. The system 100 may include a wireless detector 104 with a CSI sensing engine 108, at least one access point device 110 that includes a transmitter of wireless signals, a network 115 (e.g., WLAN, a wide area network (WAN), or cellular), and a computing device 150. The wireless detector 104, which may be a WLAN receiver, may be located in a room (or other space) in or near a building in order to detect presence associated with the room (or other space). The access point device 110, which may be a WLAN transmitter, may transmit wirelessly over multiple channels, at least one of which is received by a receiver within the wireless detector 104. The access point device 110 may be in the same or a different room than the wireless detector 104. In at least one embodiment, the wireless detector 104 includes the CSI sensing engine 108 that collects and processes CSI data as described in detail below to be input into a machine learning (ML) model 106 to make an inference of a motion or a no-motion condition within a geographic region surrounding the wireless detector 104. In at least one embodiment, the wireless detector 104 includes the CSI sensing engine 108 that collects and processes CSI data as described in detail below to be input into a respiration monitoring system 102 to detect and monitor a respiratory rate of a user within a geographic region surrounding the wireless detector 104. In another embodiment, the CSI sensing engine 108 can collect and process CSI data so that not all of the CSI data needs to be stored or transmitted to the computing device 150. Rather, the CSI sensing engine 108 can collect and process the CSI data so that only the CSI data that helps infer motion or no-motion conditions is stored or transmitted to the computing device 150. This can help reduce power consumption by the wireless detector 104, reduce memory requirements, or the like. In other embodiments, the CSI sensing engine 108 can operate in other frequency bands than 2.4 GHz in which CSI can be measured, such as other ISM bands like 5 GHZ, cellular frequency bands (e.g., LTE, 4G), or the like.

In various embodiments, the wireless detector 104 may receive first data indicative of channel properties of a communication link between the wireless detector 104 and the access point device 110. The wireless detector 104 (or some remote device to which the first data is transmitted) may classify the first data to determine whether a human presence has been detected. This classification, as mentioned, may be performed using a trained supervised machine learning (ML) model, such as a support vector machine (SVM) model, a neural network (NN) model, or another trained ML model.

The computing device 150, located in the cloud across the network 115, may perform the initial training of a supervised ML model 158 and provide a respiration monitoring system 102 for detecting and monitoring the respiration of one or more users using wireless signals in a wireless local area network. In at least one embodiment, the supervised ML model 158 is the same as the ML model 106 at the wireless detector 104. In other embodiments, different models can be used for the supervised ML model 158 and the ML model 106. In another embodiment, the ML model 106 is a sub-model of the supervised ML model 158. In another embodiment, the ML model 106 is one or more layers of the supervised ML model 158 that are deployed on the wireless detector 104. The computing device 150 may include, for example, a processor 152 and storage device 156. The storage device 156, which may be understood to include computer memory and/or storage, may include a supervised ML model 158 (e.g., code for execution of the supervised ML model), respiration monitoring system 170, training data 160, and pre-trained classifiers 162, which may be used in performing detection and location identification of persons within buildings. The pre-trained classifiers 162 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. In one embodiment, a classifier for a human may be trained to recognize the human movement as distinguished from the movement of pets or curtains. The respiration monitoring system 102 can be a sub-process or companion application of the respiration monitoring system 170. Alternatively, the respiration monitoring system 170 can be the same as the respiration monitoring system 102.

The training data 160 may later be updated over time as people come and go through the room, and the data captured at the wireless detector 104 (and at other wireless detectors and receivers) within the building may include additional data, including channel properties, captured during periods of time in which the room may change, and particularly with reference to detecting people moving within the room. This updated training data may then be used to train the pre-trained classifiers 162 further so that further presence detection may be improved. For example, an updated supervised ML model 158 may be transmitted periodically by the computing device 150 to the wireless detector 104 (or to a remote second device) used to perform classification to determine the human presence in the future.

Employing trained ML models to perform presence detection may be performed on different types of channel property data, including RSSI data, CSI data, or a combination of both. Additional sources of signal characteristics, power, channel properties, or other channel information may also be employed, and therefore, RSSI and CSI are but a listing of understood and available forms of channel properties.

Accordingly, in one embodiment, the wireless detector 104 may receive and transmit RSSI, which is a parameter (e.g., channel properties) that has a value of zero ("0") to an RSSI maximum value (referred to as "RSSI Max"), and is indicative of the signal strength of a wireless signal associated with a wireless network. Accordingly, RSSI is a measurement value of power present in received wireless signals, and contains a single value per packet. For example, RSSI can be measured as the radio frequency power level that a client device receives from an access point, such as a wireless router. In another implementation, RSSI may be a measurement of the energy observed at the antenna by a wireless PHY of the receiver used to receive a current PPDU of the receiver. For example, in one implementation of a home WLAN (e.g., using the WiFi® technology), the wireless detector 104 may generate the RSSI either based on a data frame received or a beacon from an AP node. The RSSI may fluctuate when the environment changes. Such changes can be caused by many factors, such as moving a transmitter or receiver, moving objects nearby the AP or client, a change in ambient noise level, temperature swings, or other such factors that cause fluctuations in RSSI.

In another embodiment or implementation, the wireless detector 104 may measure and transmit CSI, which is data that includes channel properties of a communication link between a transmitter and a receiver. For example, a receiver within the wireless detector 104 may retrieve the CSI from a baseband channel estimator with which to perform presence detection. The receiver may adjust the rate of sampling channel properties by the baseband channel estimator. The CSI may include a detailed channel impulse response with both amplitude and phase information across all the OFDM subcarriers and be updated (at the maximum rate) with every OFDM symbol. This may provide more information about the environment under surveillance and thus may improve detection capability when applying a trained ML model, as discussed herein, to CSI data or CSI-liked data.

As described above, CSI-based motion detectors work based on disruption to the channel state information and multipath effects of WLAN transmission between APs, smart speakers, streaming devices, or the like. However, conventional solutions need higher-cost radios to obtain higher quality CSI data, making it difficult to use the conventional solutions in IoT devices and other devices with lower-cost radios. The CSI sensing engine 108 and the respiration monitoring system 102 can overcome these challenges and others by providing respiration monitoring with lesser quality or noisy CSI data. The CSI sensing engine 108 and the respiration monitoring system 102 can be used in various applications, such as: 1) medical and health care (e.g., monitoring the daily activity pattern of the user for aging-in-place.; 2) livelihood detection or presence detection (e.g., detecting the presence of people near the IoT device for security purposes; and 3) sleep monitoring (e.g., assess the sleep quality from the motion and respiratory patterns.), using smart-home IoT devices, such as voice-assistant devices, tablets, or the like. The CSI sensing engine 108 and the respiration monitoring system 102 can provide an end-to-end algorithm pipeline for the respiration monitoring system based on the lower-quality CSI data extracted from low-cost Wi-Fi® chipset. The CSI sensing engine 108 and the respiration monitoring system 102 can provide outlier removal filters for both sparsely-distributed outliers and densely-distributed outliers of the noisy CSI measurement. The CSI sensing engine 108 and the respiration monitoring system 102 can provide a set of features extracted from patterns of the breathing spectrum to boost the robustness and accuracy of the breathing rate estimator. The CSI sensing engine 108 and the respiration monitoring system 102 can provide CSI-based respiration detection and respiration monitoring in the 2.4 GHz band, even with lower-cost radios in IoT devices. The CSI sensing engine 108 and the respiration monitoring system 102 can provide CSI-based respiration detection and respiration monitoring in the 2.4 GHz band despite the congestion and interference in the 2.4 GHz band. Additional details of the CSI sensing engine 108 are described below with respect to FIG. 1B to FIG. 16 (deleted).

Figure 1B:
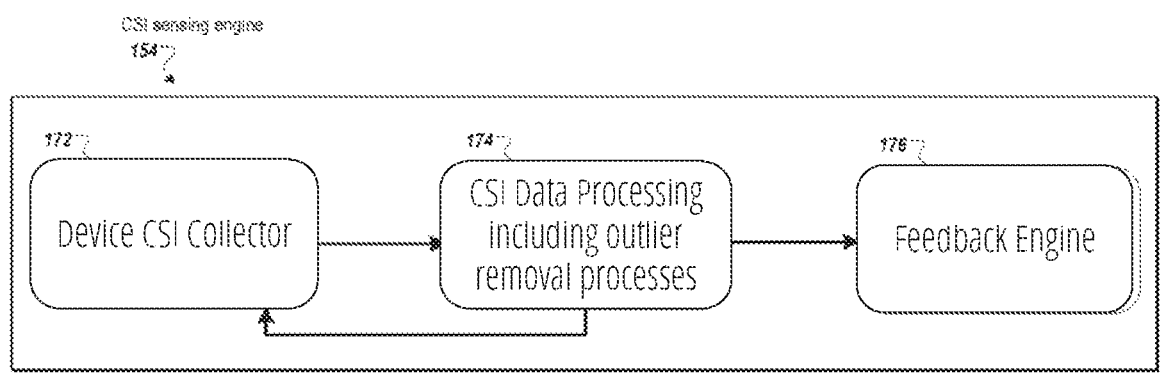
FIG. 1B is a block diagram of a CSI sensing engine, according to at least one embodiment.

FIG. 1B is a block diagram of a CSI sensing engine 108, according to at least one embodiment. The CSI sensing engine 108 for CSI-based sensing includes three main software components: device CSI collector 172, CSI data processing 174, including outlier removal processes, and feedback engine 176. The device CSI collector 172 collects data from one or more devices in a WLAN network, and CSI sensing engine 108 can be used to identify a subset of the CSI data that is least impacted by interference and congestion in the 2.4 GHz frequency band to optimize the performance of the CSI-based detection. Based on the decision made by CSI data processing 174, the feedback engine 176 can update a database of wireless channels to be used for outlier removal processes, respiration monitoring, the time-division, channel diversity process, or other processes. In at least one embodiment, a sparse outlier process and a cluster outlier process can be used.

The sparse outlier process is a set of operations to remove, adjust, or replace one or more amplitude values of the CSI samples that are considered outliers. The sparse outlier process can be an outlier removal technique to remove outliers in the CSI data. As described above, CSI data includes CSI samples with the detailed channel impulse response with both amplitude and phase information across all the channel subcarriers and is updated every symbol. The sparse outlier process can identify outliers in the CSI samples by using a Hampel filter. The Hampel filter can determine correlation values between a sample and a number of neighboring samples (e.g., 30 frames before/after the current frame). The Hampel filter can identify the correlation values that satisfy an outlier threshold that represents enough change in the correlation values to be considered an outlier sample. Once identified by the Hampel filter, the sparse outlier process can remove those outlier CSI samples. In other embodiments, the sparse outlier process can adjust the amplitude values of those outlier CSI samples to a new amplitude value, such as a mean amplitude value, a median amplitude value, an average amplitude value, or the like, so that the CSI sample is no longer an outlier. In other embodiments, the sparse outlier process can replace the amplitude values of those CSI samples with a different amplitude value, such as a mean amplitude value, a median amplitude value, an average amplitude value, or the like. The Hampel filter can provide a dynamic threshold that is based on the neighboring samples, allowing the filter to account for the dynamics in the CSI data, as compared to identifying outliers with a static threshold type comparison. In another embodiment, the outliers can be identified using other types of filters or threshold comparison techniques.

The cluster outlier process is a set of operations to remove one or more CSI samples of one or more clusters of outliers. The cluster outlier process can be an outlier removal technique to remove cluster(s) of outliers in the CSI data. The number of outliers in the CSI data can be very large. When this happens, the Hampel-based outlier removal filter does not remove the outliers since the filter operates on the assumption that the outlier is rare and sparsely distributed. As a result, there can be two or more clusters in the CSI data. The cluster outlier process can test the existence of a "significant" cluster by calculating a cluster threshold to classify the two cluster of distances and classifying a CSI sample as a potential outlier in response to its corresponding distance to the median being larger than the cluster threshold. The cluster outlier process can quantify a score of the likelihood of the existence of a significant outlier by determining a score of the outlier cluster and determining whether the score satisfies a specified score threshold, representing a significant cluster. If the score of the outlier cluster is greater than the score threshold, for example, the CSI samples are removed from the CSI data.

The CSI sensing engine 108 can be used in connection with a mobile application that prompts a user for information to improve the performance of the CSI-based detection. For example, the mobile application can provide a user interface to allow the user to input "motion" or "no motion" ground truth information for the CSI data processing 174.

The device CSI collector 172 can collect RF channel properties (e.g., CSI) of a communication link between the wireless detector 104 and the access point device 110. The device CSI collector 172 can collect RF channel properties of one or more channels between one or more devices in the WLAN. The device CSI collector 172 can receive the RSSIs, CSI data, or the like from the RF front-end or a WLAN module that collects this data, as described below with respect to FIG. 1C, or from another wireless device. That is, one wireless device can collect the CSI data, and the CSI data can be provided to another device for CSI data processing.

In another embodiment, if the device CSI collector 172 can capture CSI packets at desired time intervals, the processing logic filters and preprocesses the CSI values in the CSI packets (also referred to as CSI samples). In at least one embodiment, the filter and preprocessing can be done on the device when collected. In another embodiment, the device can send the raw data to the cloud system, and the cloud system can filter and preprocess the raw data. In at least one embodiment, the processing logic can filter the CSI samples so that only some of the CSI samples are sent to the cloud system. In another embodiment, the processing logic can normalize the CSI samples. The processing logic can perform some time-domain filtering to remove noise in the CSI samples in at least one embodiment. The processing logic applies a hamming filter to filter out CSI samples with a high variance in at least one embodiment. In at least one embodiment, some CSI values are missing, and the processing logic can interpolate to obtain the CSI values.

In at least one embodiment, the processing logic computes one or more statistical parameter values over a time period. The statistical parameter values can include a maximum value, a minimum value, a mean value, a variance value, a standard deviation value, an entropy value, a mean cross rate value, a skewness value, a kurtosis value, or the like. In at least one embodiment, the device CSI collector 172 (or the CSI data processing 174) computes three statistical values in evaluating a sequence of CSI samples, including an average (mean) value, a variance value, and a standard deviation (SD) value. The average value represents a constant level of the samples. The average value can specify the average or constant value of a signal. The variance value indicates the magnitude of the fluctuations in the average value. The variance value can represent the magnitude squared, or power, of the fluctuating component of the signal. The SD value is an indication of the magnitude of the fluctuating component of the signal. In at least one embodiment, the device CSI collector 172 (or the CSI data processing 174) computes an FFT of the CSI data over time and across OFDM subcarriers. In another embodiment, the processing logic computes statistics of the FFT outputs as well, such as the FFT mean, variance, SD, or the like. In at least one embodiment, the device CSI collector 172 can compute an image (e.g., a two-dimensional matrix of values) representing the channel that can be used to classify as motion or no motion detections. The device CSI collector 172 (or the CSI data processing 174) can compute statistical values of the FFT data, such as the FFT mean values, the FFT variance value, and the FFT standard deviation values.

In general, the CSI data for a channel is not expected to change when there is no motion or presence to disrupt the channel. If a person is present or moves between the transmitter and receiver, the CSI data for the channel is expected to change. The processing logic can compute the FFT of the CSI data to analyze the frequency components. After FFT, the CSI data can show signal patterns for certain subcarrier indexes that represent different feature extractions representing the presence and motion or non-motion of a person in a location with the transmitter and receiver. For example, the feature extractions can represent the presence of a person, whether the person is walking slowly, walking, slowly moving while sitting, or other features. When there is no motion between the transmitter and receiver, there may be a direct current (DC) component in the FFT values and lower values or zero values in the other frequency components. In contrast, when there is motion between the transmitter and receiver, there may be spikes in the frequency components where the motion affects the channel. The FFT values can help classify when there is no motion and motion. The processing logic compares the statistical parameter values with expected values or thresholds for motion and no motion in at least one embodiment. For example, the processing logic can compare the current FFT values against an FFT mean or the current SD against an SD threshold. Similarly, the processing logic can compare the current variance against a threshold variance. In at least one embodiment, if the FFT value is less than the FFT mean (or SD), the processing logic determines whether there is a match with an available ground truth (GT) table. In at least one embodiment, if the FFT value is greater than the FFT mean (or SD), the processing logic determines whether there possible motion with a confidence score greater than a specified threshold (e.g., 70%). If the confidence score exceeds the specified threshold, the processing logic determines whether there is a match with the available GT table. In at least one embodiment, the GT table is a decision-mapping table. In at least one embodiment, the processing logic returns to capture CSI packets when there is a no-motion condition to validate motion detection. In at least one embodiment, the processing logic performs the numerical analysis as a check that uses less computational resources than ML classifications in a machine learning-based analysis.

In at least one embodiment, the processing logic can analyze raw pixels of the CSI image generated in the previous operation and perform dimensionality reduction and clustering techniques, like UMAP and TSNE, to analyze and correlate the CSI FFT output patterns. In at least one embodiment, the clustering can be performed iteratively. The processing logic determines whether the current data matches previous data. If there is a match, the processing logic determines if the match has a greater confidence score than a specified threshold (e.g., 75%). If the confidence score exceeds the specified threshold, the processing logic can determine a motion or a no-motion condition accordingly. In some cases, the processing logic can prompt the user to change the placement of the device and perform additional local training of the ML model for the local conditions.

In at least one embodiment, the processing logic can perform local training by receiving the CSI stream and performing interpolation and infinite impulse response (IIR) filtering on the CSI stream. The processing logic can compute one or more statistical parameter values and the FFT of the CSI values. The processing logic can also compute statistical parameter values on the FFT results. For example, the processing logic can compute the variance, the mean, the cross rate, and entropy of the interpolation and IIR filtering results. The processing logic can also compute the variance, the mean, the cross rate, and entropy of the results of the FFT. The processing logic can label the training data set accordingly. The processing logic can receive user feedback to help with labeling the training data set. The training data set can be used to train the ML model used in the classification stage. The processing logic can perform these operations as additional training to fine-tune an existing ML model.

In the classification stage, the processing logic receives the CSI stream and performs interpolation and IIR filtering on the CSI stream. The processing logic can compute one or more statistical parameter values and the FFT of the CSI values. The processing logic can also compute statistical parameter values on the FFT results. For example, the processing logic can compute the variance, the mean, the cross rate, and entropy of the interpolation and IIR filtering results. The processing logic can also compute the variance, the mean, the cross rate, and entropy of the results of the FFT. The processing logic can generate the testing data set input into the trained ML model to detect presence, motion, no-motion, or the like. The classification in the classification stage can also receive user feedback to improve the performance of the trained ML model.

Figure 1C:
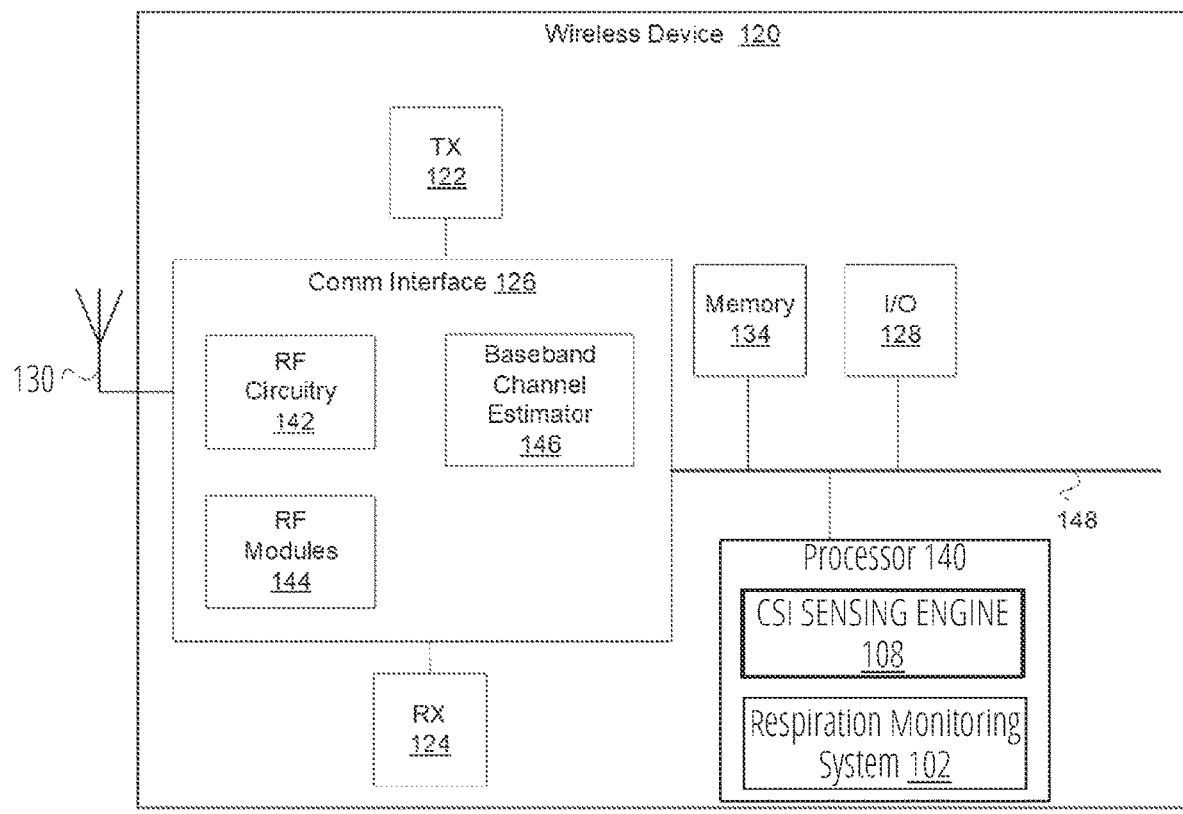
FIG. 1C illustrates a wireless device adapted to detect and transmit CSI or Received Signal Strength Indicator (RSSI) data useable by the CSI sensing engine and a respiration monitoring system to perform respiration monitoring, according to at least one embodiment.

FIG. 1C illustrates a wireless device 120 adapted to detect and transmit CSI or RSSI data useable by the CSI sensing engine 108 and a respiration monitoring system 102 to perform respiration monitoring, according to at least one embodiment. Accordingly, the wireless device may represent the wireless detector 104 or the access point device 110 in different embodiments. The wireless device 120 may include, but not be limited to, a transmitter (TX) 122 (e.g., a WLAN transmitter), a receiver (RX) 124 (e.g., a WLAN receiver), a communications interface 126, one or more antenna 130, a memory device 134, one or more input/output (I/O) devices 128, and a processor 140. These components may all be coupled to a communications bus 148. The memory device 134 may include storage in which to store the supervised ML model 158, e.g., an SVM or a NN model, or other software components (e.g., mobile companion application) that can perform some of the operations described herein.

In one embodiment, the receiver 124 receives first data indicative of channel properties of a first communication link between the wireless device 120 and a wireless transmitter 122 in the access point device, both of which are located in a geographical region (e.g., home, office building, or the like). In one embodiment, the processor 140 may be configured to direct the TX 122 to transmit the first data, which includes the channel properties, to a remote computing device (e.g., the computing device 150) over the network 115 for supervised ML processing or additional respiration monitoring. The processor 140 may further be configured to perform preprocessing of the first data and to classify the preprocessed first data as detecting either a stationary object (e.g., which may be known already to be stationary) or detecting a moving object such as a human, as described herein. In various embodiments, the I/O devices 218 may include an input device, such as a microphone, and an output device such as a speaker.

The antennas (such as the antenna 130) described herein within various devices may be used for Long Term Evolution (LTE) frequency bands, third-generation (3G) frequency bands, Wi-Fi®, and Bluetooth® frequency bands, or other WLAN frequency bands, including Zigbee®, Z-wave™ or the like, WAN frequency bands, global navigation satellite system (GNSS) frequency bands such as global positioning system (GPS) frequency bands, or the like.

As illustrated in FIG. 1C, the communications interface 126 may further include RF circuitry 142, a set of RF modules 144, and a baseband channel estimator 146. In one embodiment, one of the RF modules 144 may include a WiFi® PHY at which the RF energy of received RF signals may be measured for purposes of RSSI. The baseband channel estimator 146, by virtue of being incorporated within the communications interface 126, may be coupled to the antenna 130, the TX 122, and to the RX 124, and be adapted to estimate the CSI (or the RSSI) for each channel. As discussed, the CSI includes a detailed channel impulse response (e.g., containing channel properties) with both amplitude and phase information across all the OFDM subcarriers and is updated (at the maximum rate) with every OFDM symbol. This provides more information about the environment under surveillance and thus provides excellent detection capability when applying a supervised ML model or respiration monitoring to CSI data.

The wireless device 120 may, in various embodiments, continuously upload RSSI or CSI data to the computing device 150 (1) for use in supervised ML model processing or may buffer the RSSI or CSI data in the memory device 134 (or other computer storage) and then periodically upload the RSSI or CSI data at a predetermined time interval. This data may allow the computing device 150 to perform updates to the training of the supervised ML model 158. In one embodiment, the wireless device 120 (or a co-located computing system) is adapted to include sufficient memory, storage, and processor power to be able to directly perform preprocessing and classification with the supervised ML model 158 discussed herein. In one embodiment, the CSI sensing engine 108 can perform various operations to collect CSI data, process the CSI data, and use the supervised ML model 158 to detect motion and no-motion conditions.

In some embodiments, the wireless device 120 (or co-located computing system) may contain sufficient processing power to perform respiration monitoring and thus may work independently of access to cloud-based resources. In some embodiments, the wireless device 120 (or co-located computing system) may contain sufficient processing power to perform updates to the training of the supervised ML model 158 and thus may work independently of access to cloud-based resources. These updates may be made using newly received data containing channel properties that confirm or fail to confirm the accuracy of the pre-trained classifiers 162, which are trained as a part of the supervised ML model 158.

In another embodiment, the CSI sensing engine 108 can perform various operations to collect CSI data, process the CSI data, and use the respiration monitoring system 102 to detect and monitor a respiratory rate of a user in a geographical region, as described below with respect to FIG. 2 to FIG. 15.

Figure 2:
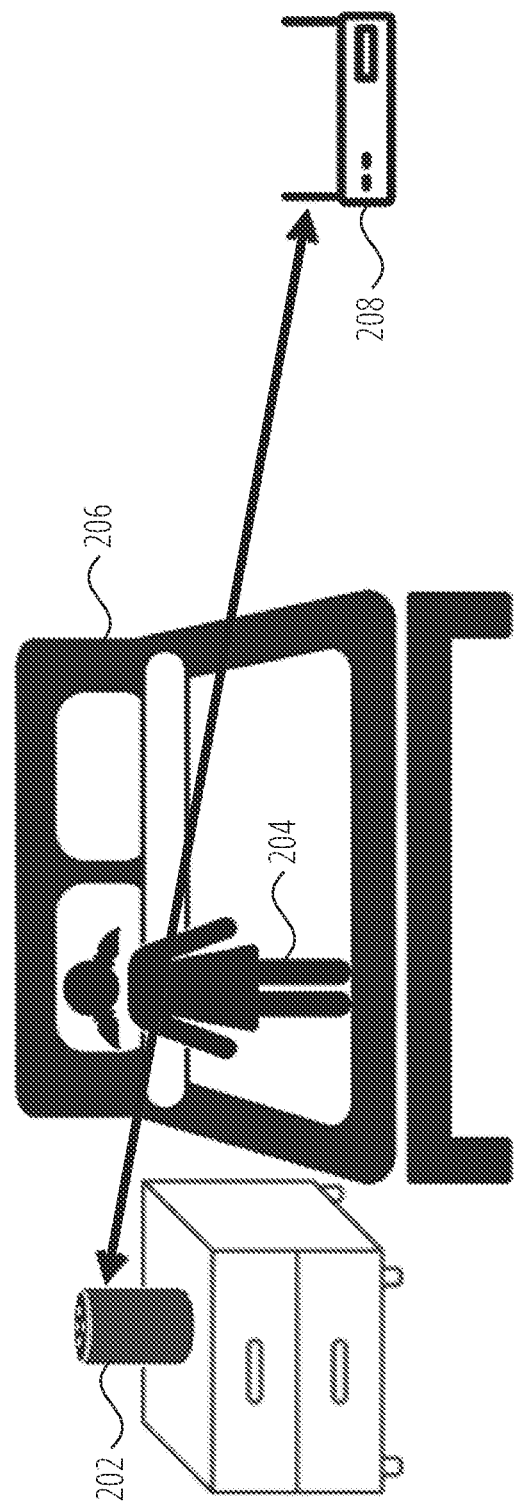
FIG. 2 illustrates a wireless device with the CSI sensing engine and the respiration monitoring system for respiration monitoring of a user in a bed, according to at least one embodiment.

FIG. 2 illustrates a wireless device 202 with the CSI sensing engine 108 and the respiration monitoring system 102 for respiration monitoring of a user 204 in a bed 206, according to at least one embodiment. CSI data reflects how radio signals propagate from a transmitter (Tx) to a receiver (Rx), e.g., reflected or scattered off all reflectors in the space such as the walls, furniture, human bodies, etc., and it is used for adapting the wireless data transmission to the time-varying channel conditions. CSI is highly sensitive to environmental perturbations. Any body motions, including tiny chest and abdomen movements during respiration, will alter the paths of signal propagation and thus modulate the wireless signal before it arrives at the receiver, allowing the wireless device 202 to capture these motions and monitor human's sleep from the measured CSI time series using the CSI sensing engine 108 and respiration monitoring system 102, as described herein. Whenever the receiver receives a packet, the CSI is estimated and extracted at the receiver. The CSI is a vector of complex values, i.e., [H1, H2, . . . , HK], where K is the number of channel subcarriers of the received packet. The sampling interval can be denoted between the adjacent packets, then a time series of CSI values can be obtained for each subcarrier, and the information of the environmental dynamics (human motion, breathing . . . ) are thus embedded in the measured CSI values.

In this embodiment, the wireless device 202 is connected to a router 208. The CSI is estimated and consumed on the wireless device 202. In other embodiments, the wireless device 202 can be located in other geographical regions and in connection with one or more APs. Additional details of a multi-input receiver are described below with respect to FIG. 3A to FIG. 3C.

Figure 3A:
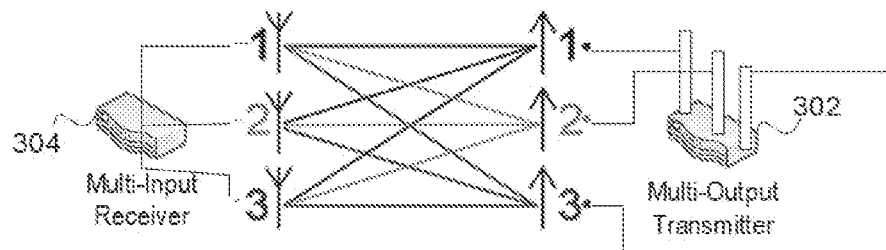
FIG. 3A is a flow diagram of a method of motion detection in the 2.4 GHz band, according to at least one embodiment.

FIG. 3A is a block diagram of a multi-input receiver 304 and a multi-output transmitter 302 in communication, according to one embodiment, to represent how CSI operates. The standard Institute for Electrical and Electronics Engineers (IEEE) 802.11n was established in 2007 to boost the range and throughput of WiFi® service. In IEEE 802.11n, multiple-in, multiple-out (MIMO) OFDM is used, and the physical layer presents a value to estimate the channel status in each subcarrier, e.g., the CSI for each subcarrier. The CSI may therefore be expressed as:

$$H = \begin{bmatrix} h_{11} & h_{12} & \cdots & h_{1N_r} \\ h_{21} & h_{22} & \vdots & h_{2N_r} \\ \vdots & \vdots & \vdots & \vdots \\ h_{N_r1} & h_{N_r2} & \vdots & h_{N_rN_r} \end{bmatrix} \quad (1)$$

where $$H(f_k) = |H(f_k)|e^{j\angle H(f_k)} \quad (2)$$

The term $H(f_k)$ represents the CSI value at the subcarrier level with frequency $f_k$. Hfk denotes the amplitude, and $\Box Hf_k$ represents the phase in the subcarrier. The CSI describes how a signal propagates between the transmitter and the receiver device in amplitude and phase. The CSI also reveals the combined effect of scattering, fading, and power decay with respect to the distance of the received signals.

Figure 3B:
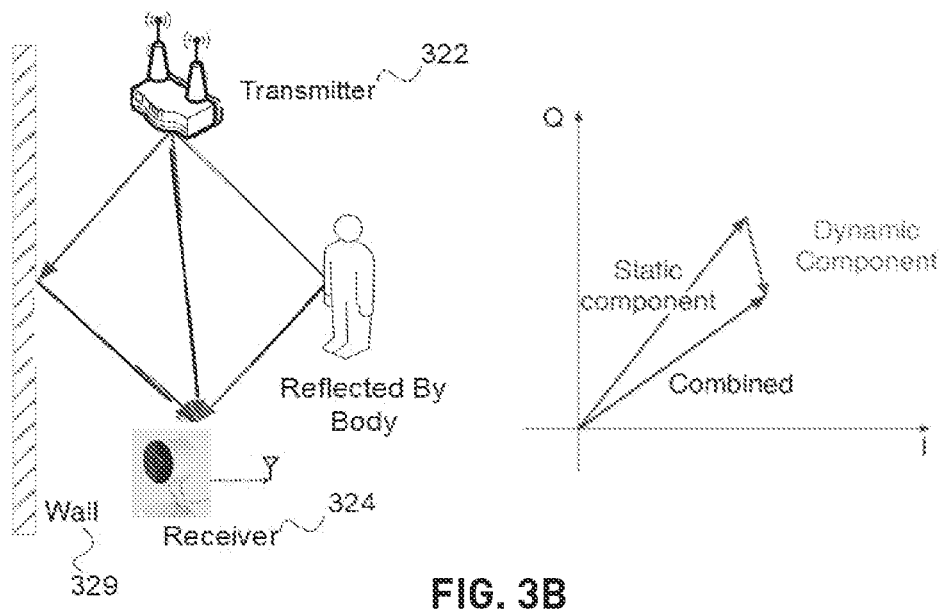
FIG. 3B is a reflection diagram of wireless signals between a transmitter and a receiver with a stationary human, according to one embodiment.

FIG. 3B is a reflection diagram of wireless signals between a transmitter 352 and a receiver 304 with a stationary human, according to one embodiment.

Figure 3C:
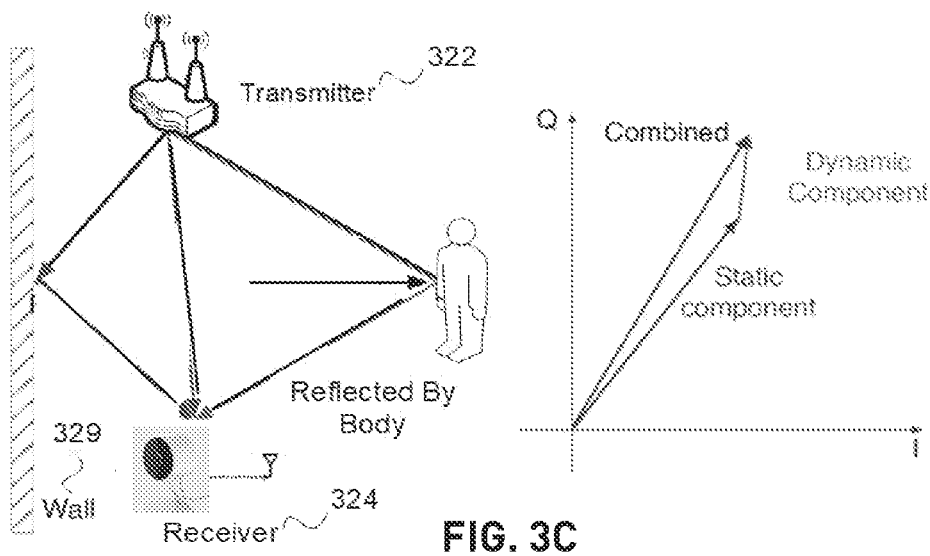
FIG. 3C is a reflection diagram of wireless signals between the transmitter and the receiver with a moving human, according to one embodiment.

FIG. 3C is a reflection diagram of wireless signals between the transmitter 322 and the receiver 324 with a moving human (e.g., $d_k(t)$), according to one embodiment. In one example, the transmitter 322 may be the multi-output transmitter 302 (e.g., a second wireless device), and the receiver 342 may be the multi-input receiver 304 (e.g., a first wireless device).

The transmitter 322 may transmit in many directions, including a line of sight (LoS) path as well as paths that reflect off objections, such as a wall 329. Signal propagation may also be disturbed by human motion, and different motion activities may return different characteristics in the CSI data. In this way, machine learning may be used to classify the presence of the human. Equation (3) may depict the CSI data within a static channel, e.g., within a communication link that includes no human movement. Equation (4) may detect the CSI data within a combination of a static channel and dynamic channel, where a portion of the CSI data indicates human movement.

$$H(f, t) = e^{-j2\pi\Delta ft}\sum_{k=1}^{N} a_k(f, t)e^{-j2\pi f \tau_k(t)} \quad (3)$$

$$H(f, t) = e^{-j2\pi\Delta ft}\left(H_S(f) + \sum_{k \in P_d} a_k(f, t)e^{-j\frac{2\pi d_k(t)}{\lambda}}\right) \quad (4)$$

where $H_x$ (f) in Equation (4) is the static channel component.

As described above, the wireless device 202, using the CSI sensing engine 108 and respiration monitoring system 102, can use an algorithm to process the CSI data to detect and monitor a respiratory rate of a user in a geographical region. In at least one embodiment, the algorithm can include three processing modules or blocks: 1) a CSI pre-processing block; 2) a spectrum extraction block; and 3) a respiration rate estimation and detection block. The CSI preprocessing block can clean the noisy CSI measurement for further processing. The spectrum extraction block can determine a breathing spectrum from the subcarriers of the cleaned CSI measurement. The respiration rate estimation and detection block can detect the presence of respiration signals and estimate the corresponding respiratory rate based on the features extracted from the breathing spectrum. The details of these three processing blocks or modules are described below with respect to the operations of FIG. 4.

Figure 4:
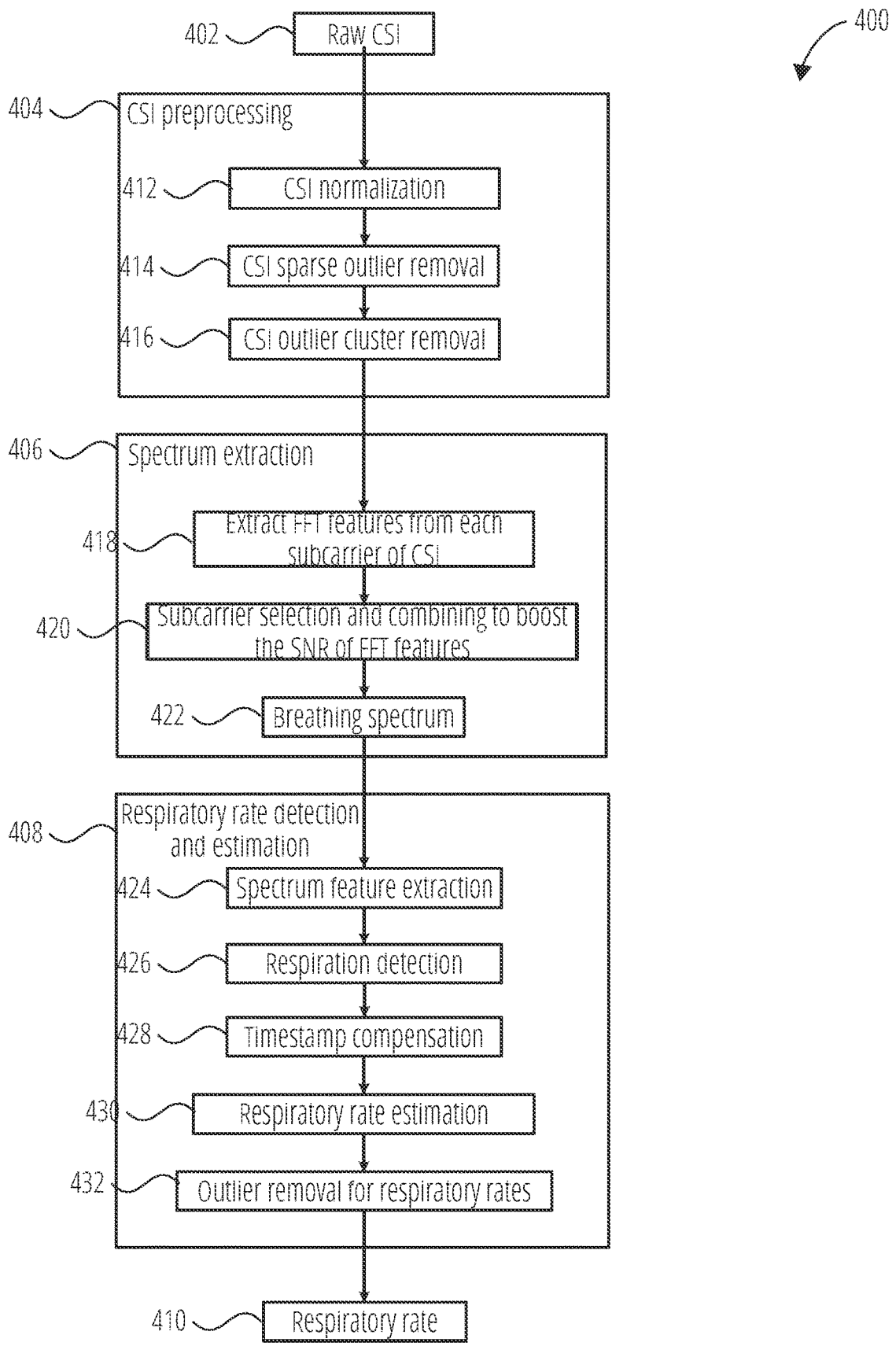
FIG. 4 is a flow diagram of a method of respiration monitoring in the 2.4 GHz band, according to at least one embodiment.

FIG. 4 is a flow diagram of a method 400 of respiration monitoring in the 2.4 GHz band, according to at least one embodiment. The method 400 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104 of the computing device 150, or the wireless device 120 performs the method 400. Alternatively, other components of a disclosed device may perform some or all of the operations of the method 400.

With further reference to FIG. 4, the method 400 may begin with the processing logic receiving CSI data representing channel properties of a wireless channel between a pair of wireless devices operating in the 2.4 GHz band and generating a set of CSI samples by sampling the CSI data (block 402). The set of CSI samples can be considered the raw CSI samples before CSI preprocessing at block 404. The processing logic can start to receive the first CSI data in response to received, from a user device, a request to detect and monitor a respiratory rate of a user in a geographic region in which the wireless devices are located. The processing logic can start to receive the first CSI data in response to received, from a user device, a general request to detect a motion condition or a no-motion condition within a home using at least the pair of wireless devices operating in the 2.4 GHz band. The processing logic generates the set of CSI samples at block 402 by sampling the CSI data at a sampling rate. Increasing bandwidth and sampling rate will increase the CSI performance. In 2.4 GHZ, since bandwidth is limited to 20 MHz, the sampling rate is a programmable parameter that can be adjusted to meet the key performance indicators (KPIs) for a given application. A sampling rate that results in 30 milliseconds (ms) sampling for presence detection can achieve the required KPIs. Some chipsets can support sampling to 10 ms. The higher sampling rate can mitigate the impact caused by interference and congestion in the 2.4 GHz band. In addition, as described in more detail below, a process can be used for interference mitigation in the 2.4 GHz band. In at least one embodiment, the sampling rate is 100 Hz for the 20 MHz bandwidth of the wireless channel in the 2.4 GHz band.

For respiration monitoring, the processing logic can perform one or more CSI preprocessing operations on the set of CSI samples (block 404), perform one or more spectrum extraction operations to obtain a breathing spectrum (block 406), perform respiratory rate detection and estimation operations to obtain a respiratory rate of a user in a geographic region (block 408), and output the respiratory rate (block 410).

In at least one embodiment, the processing logic can perform CSI normalization operations (block 412), a CSI sparse outlier process (block 414), and a CSI cluster outlier process (block 416) as part of the CSI preprocessing operations at block 404. In at least one embodiment, the CSI preprocessing block performs the operations at block 404.

Figure 5A:
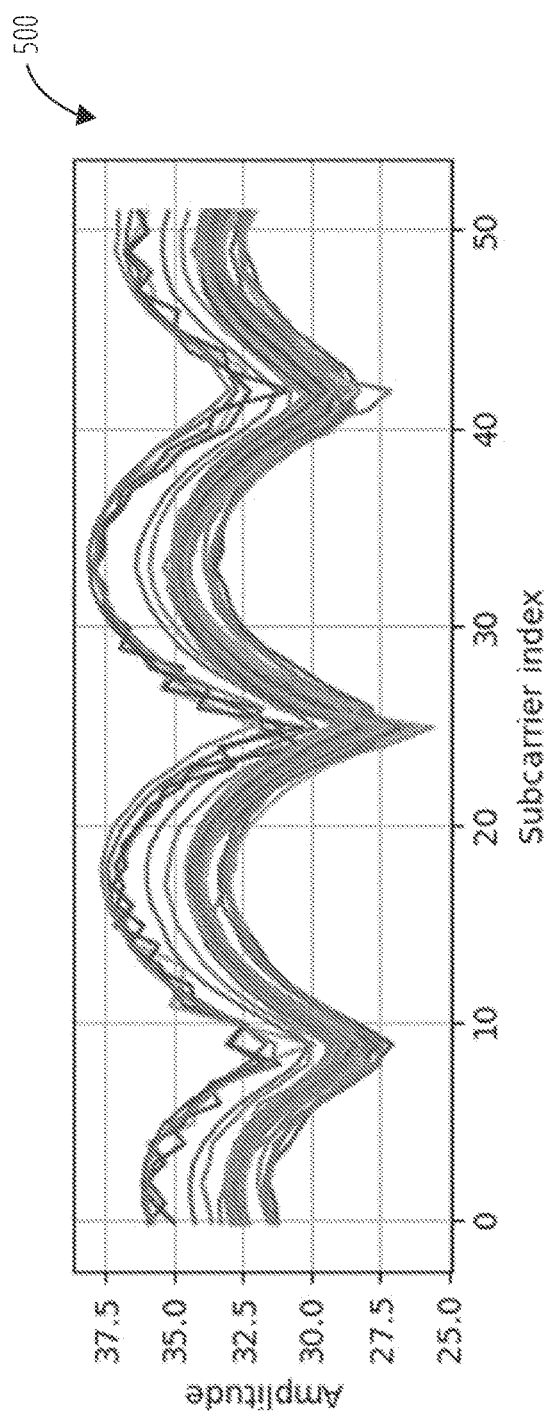
FIG. 5A is a graph of example raw CSI amplitudes from multiple CSI packets, according to at least one embodiment.

In at least one embodiment, the CSI normalization operations at block 412 can be used to correct changes in the magnitude of the measured CSI values over time due to the impact of an automatic gain controller (AGC) of an RF chain. The power of measured CSI values should be normalized. The CSI normalization operations at block 412 can obtain normalized CSI amplitudes by its 2-norm over the subcarriers for each frame. FIG. 5A is a graph 500 of example raw CSI amplitudes from multiple CSI packets, according to at least one embodiment. Graph 500 shows fading in the frequency domain and jitter caused by AGC in the RF chain.

Figure 5B:
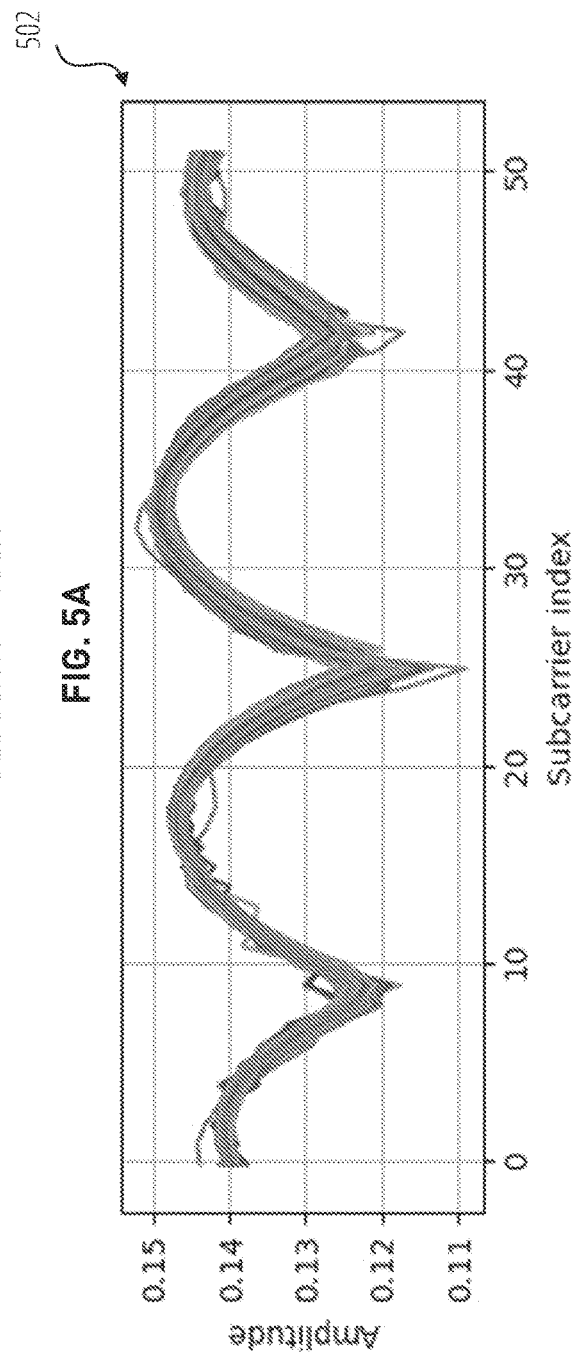
FIG. 5B is a graph of example normalized CSI amplitudes from multiple packets, according to at least one embodiment.

FIG. 5B is a graph 502 of example normalized CSI amplitudes from multiple packets, according to at least one embodiment. Graph 502 shows the CSI amplitudes being merged to one class.

Referring back to FIG. 4, in at least one embodiment, the processing logic can extract FFT features from each channel subcarrier of the CSI data (block 418) and select and combine FFT features of a number of subcarriers to boost a signal-to-noise ratio (SNR) of the FFT features (block 420) to obtain a breathing spectrum 422, as part of the spectrum extraction operations at block 406. In at least one embodiment, the spectrum extraction block performs the operations at block 406.

Figure 6A:
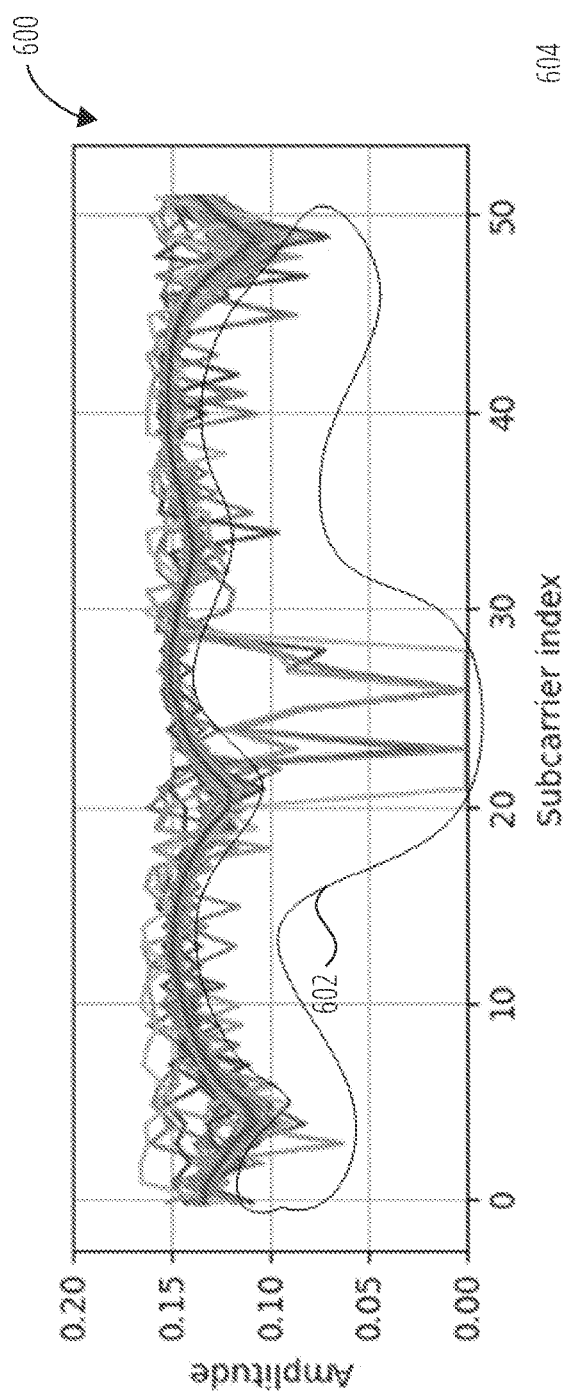
FIG. 6A is a graph of example amplitudes of CSI samples with outliers from multiple CSI packets, according to at least one embodiment.

In at least one embodiment, the processing logic performs a sparse outlier process for sparse outlier removal. In at least one embodiment, a Hampel filter (also referred to as a Hampel-based outlier filter) can be used to identify outliers in the CSI samples. The Hampel filter can determine correlation values between a sample and a number of neighboring samples (e.g., 30 frames before/after the current frame). The Hampel filter can identify the correlation values that satisfy a threshold that represents an abnormal change in the correlation values. Once identified by the Hampel filter, the sparse outlier process can remove those CSI samples, adjust the amplitude values of those samples to a new amplitude value, such as a mean amplitude value, a median amplitude value or an average amplitude value, or replace the amplitude values of those CSI samples with a different amplitude value, such as a mean amplitude value, a median amplitude value or an average amplitude value. The Hampel filter can provide a dynamic threshold that is based on the neighboring samples, allowing the filter to account for the dynamics in the CSI data. As such, the outlier threshold for outlier identification by the Hampel filter can be set according to the ongoing dynamics of CSI data. FIG. 6A is a graph 600 of example amplitudes of CSI samples with outliers 602 from multiple CSI packets, according to at least one embodiment. Graph 600 shows various outliers 602 between the subcarrier indexes 20 to 30, for example.

Figure 6B:
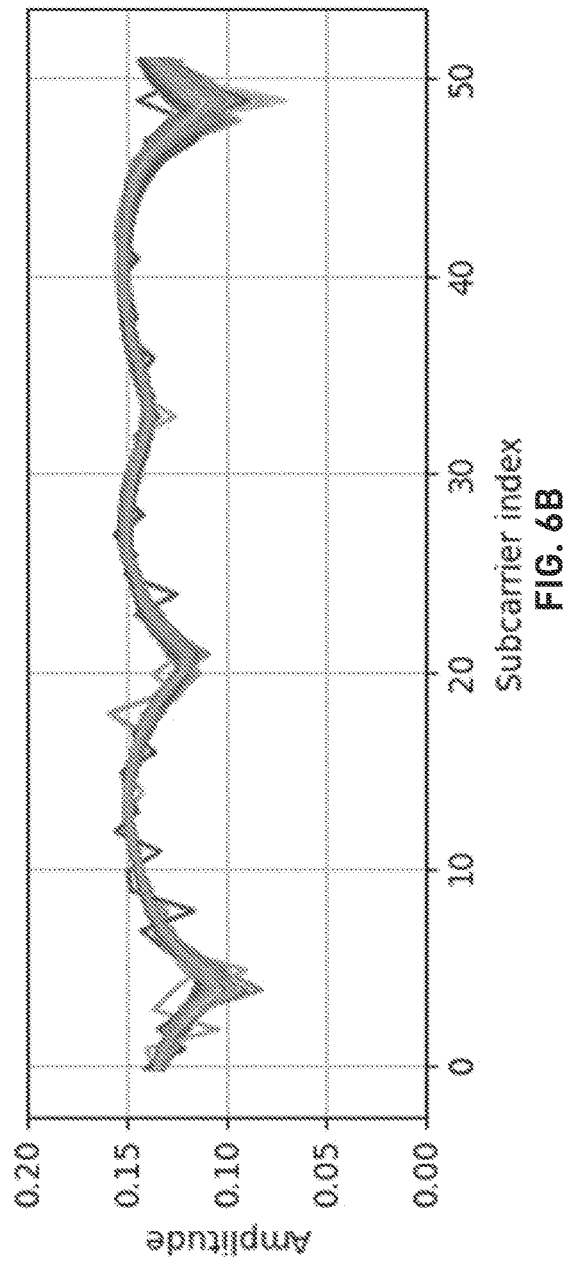
FIG. 6B is a graph of example amplitudes of CSI samples with outliers removed from multiple CSI packets, according to at least one embodiment.

FIG. 6B is a graph 604 of example amplitudes of CSI samples with various outliers 602 removed from multiple CSI packets, according to at least one embodiment. In at least one embodiment, the sparse outlier process can remove the outliers. In at least one embodiment, the sparse outlier process can replace the amplitudes of the outliers with a median or mean value. In at least one embodiment, the sparse outlier process can replace the amplitudes of the outliers with amplitudes of neighboring samples.

Referring back to FIG. 4, in at least one embodiment, the processing logic can extract spectrum features from the breathing spectrum (block 424), detect respiration (block 426), perform optional timestamp compensation (block 428), estimate the respiratory rate (block 430), and perform outlier removal for the respiratory rates (block 432) to obtain the respiratory rate, as part of the respiratory rate detection and estimation operations at block 408. In at least one embodiment, the respiration rate estimation and detection block performs the operations of block 408.

Figure 7A:
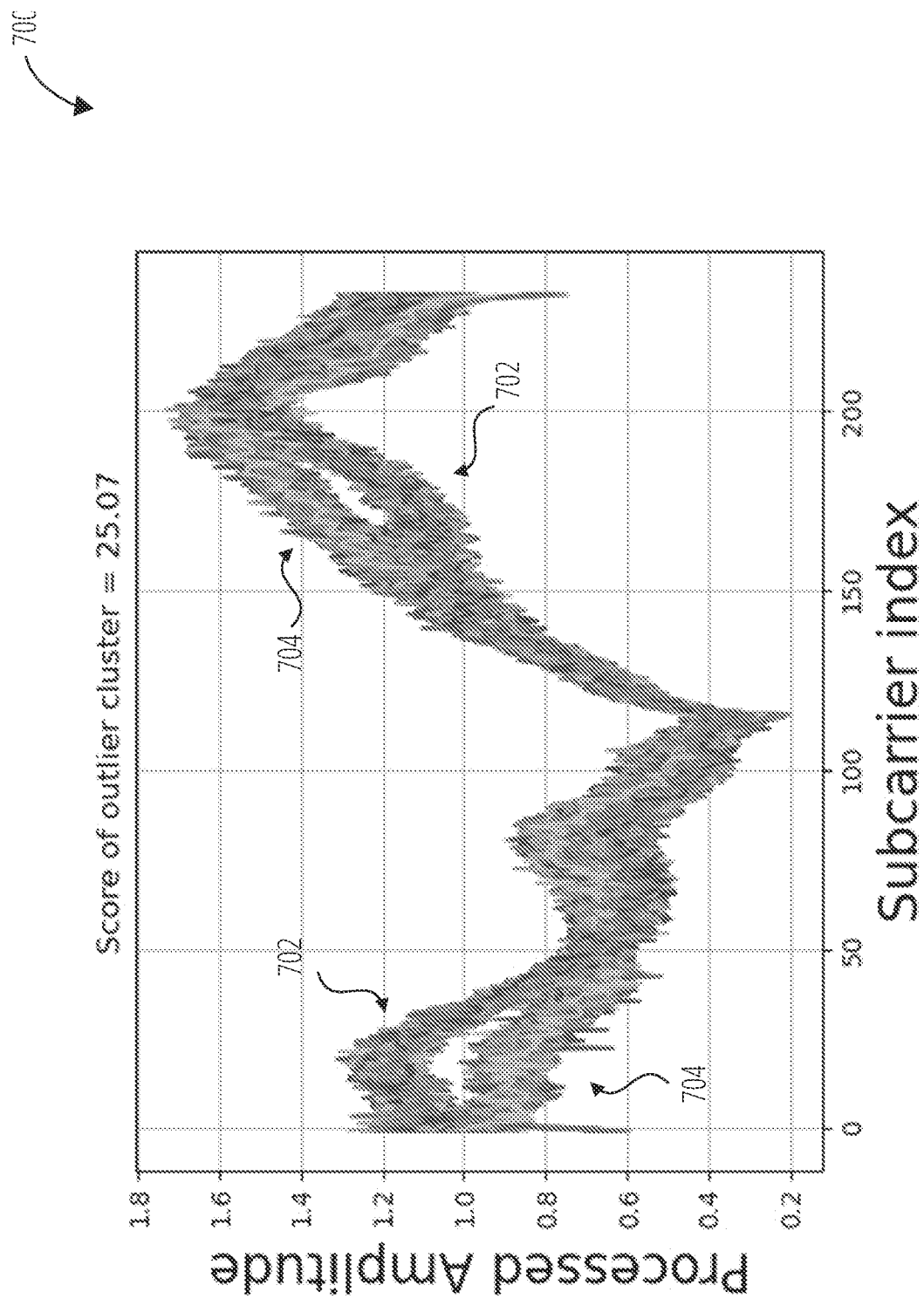
FIG. 7A is a graph of example processed wideband CSI amplitudes from multiple packets with two clusters, according to at least one embodiment.

In at least one embodiment, the processing logic performs a cluster outlier process for outlier removal for significant outlier clusters. As described herein, the CSI measurement from lower-cost WiFi® chipsets can be very noisy, and sometimes the number of CSI outliers can be very large, even comparable to that of normal CSI within a window. When this happens, the sparse outlier process does not remove some outliers since the assumption that the outlier is rare and sparsely distributed does not hold anymore. FIG. 7A is a graph 700 of example processed wideband CSI amplitudes from multiple packets with two clusters 702 and 704, according to at least one embodiment. As seen in FIG. 7A, there are clearly two clusters of these distances to a median CSI (also referred to as median amplitude). In at least one embodiment, to test the existence of a "significant" outlier cluster, the processing logic can calculate a first threshold value to classify the two clusters of distances (e.g., threshold=(max. of distances+min. of distances)/2). The CSI packet that has a distance to the median larger than the first threshold value can be classified as a "potential" outlier, otherwise, the CSI packet is denoted as a "normal" CSI packet. In at least one embodiment, the processing logic can use a simplified version of a silhouette score to quantify a likelihood of the existence of a "significant" outlier (e.g., outlier cluster score=abs (mean distances of "potential" outlier cluster-mean distances of "normal" cluster)/max (standard deviation (std) of the distances within "potential" outlier cluster, std of the distances within "normal" CSI cluster). If the outlier cluster score is larger than a second threshold value, then the processing logic can discard the "potential" outlier cluster of CSI samples. The second threshold value can be a hyper parameter that is trained during modelling. Referring to FIG. 7A, the cluster 704 is an insignificant cluster that can be identified by the cluster outlier process for removal.

Figure 7B:
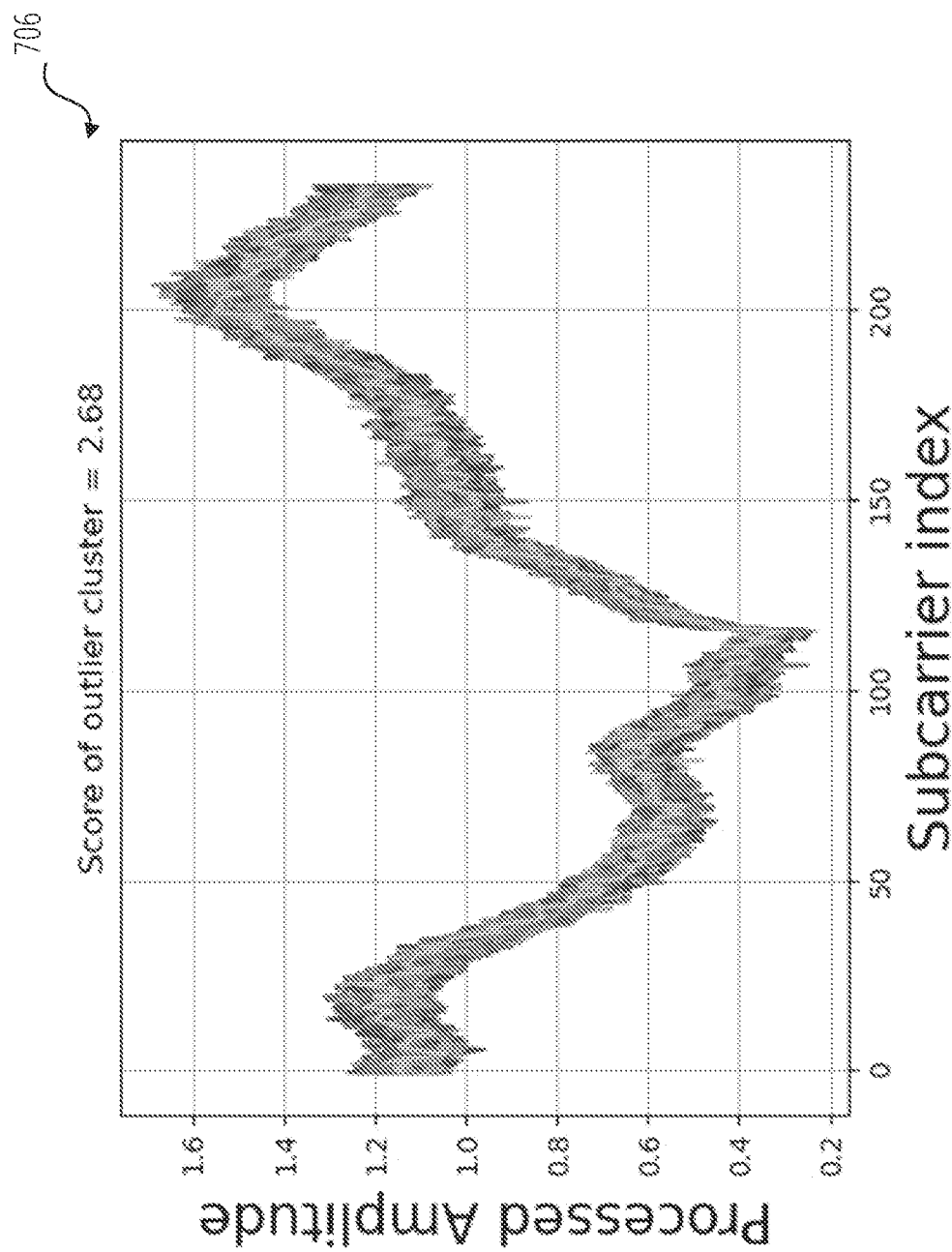
FIG. 7B is a graph of example processed wideband CSI amplitudes from multiple packets after removal of the insignificant cluster, according to at least one embodiment.

FIG. 7B is a graph 706 of example processed wideband CSI amplitudes from multiple packets after removal of the insignificant cluster 704, according to at least one embodiment.

In a further embodiment, the processing logic can perform a background subtraction operation. The background, or baseline CSI data, can represent the underlying static components in the CSI data. By subtracting the static components of the CSI data, the remaining CSI data includes dynamic components of the CSI data. Subtracting the baseline CSI data from the set of samples can magnify or isolate embedded CSI dynamics in the set of samples. In at least one embodiment, the processing logic can use a moving average window to estimate an underlying background CSI and then subtract the background from the CSI data to magnify embedded CSI dynamics.

In at least one embodiment, the processing logic can process the set of CSI samples to identify outlier samples using a median absolute deviation (MAD) of a moving window-based filter. A moving window-based filter is a low pass finite impulse response filter used for smoothing an array of sampled data samples. The filter receives the samples as inputs and determines the average of those samples as a single output. The median absolute deviation, which is a measure of statistical dispersion, subtracts the median from each value in the data set and makes the difference a positive value. The moving window-based filter can take the average of the values in the data set to identify outlier samples that have a larger variance or deviation from the other samples. The processing logic can process the set of CSI samples to replace the outlier samples with a median value. In another embodiment, the processing logic can identify outlier samples using a standard deviation measurement. The median absolute deviation can be a more robust statistic than standard deviation because the differences from the mean are not squared as they are in the standard deviation measurement. In other embodiments, the processing logic can remove the outlier samples using other methods. Regardless of the method used, the processing logic can determine a variance between collected samples within each subcarrier across a time period. The processing logic can process the second set of CSI samples to remove a trend in the second set of CSI samples by offsetting the second set of CSI samples by a mean value. The trend often manifests in low-frequency components in the CSI samples. The processing logic can process the second set of CSI samples to de-noise the second set of CSI samples using a wavelet transform that removes higher-frequency noise components in the second set of CSI samples. In other embodiments, the processing logic can process the set of CSI samples to remove low-frequency and high-frequency noise components or at least remove the effects of the low-frequency and high-frequency noise components by adjusting amplitude values in the CSI samples. In short, the processing logic can process the set of CSI samples to be within a band of interest in which motion and no-motion conditions can be detected.

The processing logic can rank a set of channel subcarrier indexes based on a second value representing an average fading power for the respective subcarrier index and a third value representing a variance of the respective subcarrier index over time. Alternatively, other parameter values can be used to rank the set of channel subcarrier indexes, such as a mean, an FFT mean, a standard deviation, an FFT standard deviation, or the like. The processing logic can determine a score of the set of channel subcarrier indexes to rank them. The processing logic can determine each channel subcarrier index score based on one or more of these parameter values. The processing logic can identify a subset of a specified number of channel subcarrier indexes with a higher score than corresponding scores of other channel subcarrier indexes in the set. For example, the subset can include top-three or top-five ranked indexes. The processing logic can determine the breathing spectrum of a user using the CSI samples corresponding to the subset of the specified number of channel subcarrier indexes.

In another embodiment, the processing logic can determine a quality metric associated with the collected CSI data and determine whether the quality metric is above a specified threshold. In this case, the quality metric being above the specified threshold indicates that the CSI data is adequate (e.g., clean) for respiratory detection and monitoring purposes. It is clean because the CSI data is not disrupted by interference and congestion in the wireless channel. In other embodiments, the quality metric can be used to determine if the CSI data is adequate for further processing. The quality metric can be quantified using various parameters, such as the size of the CSI data, that the expected CSI data is received within a specified amount of time, or any combination of parameters. In at least one embodiment for the quality metric, the processing logic can determine if the size of the set of CSI samples (or collectively the CSI data) does not exceed a second threshold value. In another embodiment for the quality metric, the processing logic can determine that the set of CSI samples (or collectively the CSI data) is not received in a specified time interval.

In response to determining that the quality metric is above the specified threshold, the processing logic can use the clean CSI samples of the CSI data to detect and monitor the respiration of the user. In at least one embodiment, the processing logic uses the device CSI collector 172 to measure the quality metric and whether the quality metric satisfies a threshold condition or criterion (e.g., exceeds a threshold value). The processing logic can also use the device CSI collector 172 to perform operations in connection with the time-division, channel diversity process, or the like. The processing logic can use the CSI data processing 174 for some or all of the operations of the spectrum extraction block (e.g., block 406). The processing logic can use the CSI data processing 714 for other processes, such as the time-division, channel diversity process, or the like. The processing logic can use the CSI data processing 174 for some or all operations of the respiratory rate detection and estimation (e.g., block 408). In another embodiment, the processing logic can use the CSI data processing 174 for the operations at blocks 216 and 210. Part or all of the CSI processing and analysis can be done on the wireless device 202, and data can be uploaded to the computing device 150 for more involved tasks.

In at least one embodiment, the processing logic performs a first-level analysis to assess a link quality and eliminate network-level issues. For example, an initial check on the basic functionality of exchanging the CSI packets can be done in a first stage. Checking if the CSI packets are being exchanged at expected timeslots; received signal strength, congestion metrics, co-existence mode, and other network parameters are analyzed to assess the quality of the link. If there is a fundamental network issue, the user can be guided to change the placement of the device; otherwise, if there are no network issues, the CSI values can be processed in a second-level analysis. The processing logic can perform the CSI preprocessing, spectrum extraction, and respiratory rate detection and estimation on the CSI data. The CSI preprocessing and spectrum extraction can measure the mean, variance across time and subcarriers, FFT mean, FFT variance, a trend of the FFT output values, or the like. These values can be compared against the minimum and maximum thresholds defined for certain conditions.

Figure 8:
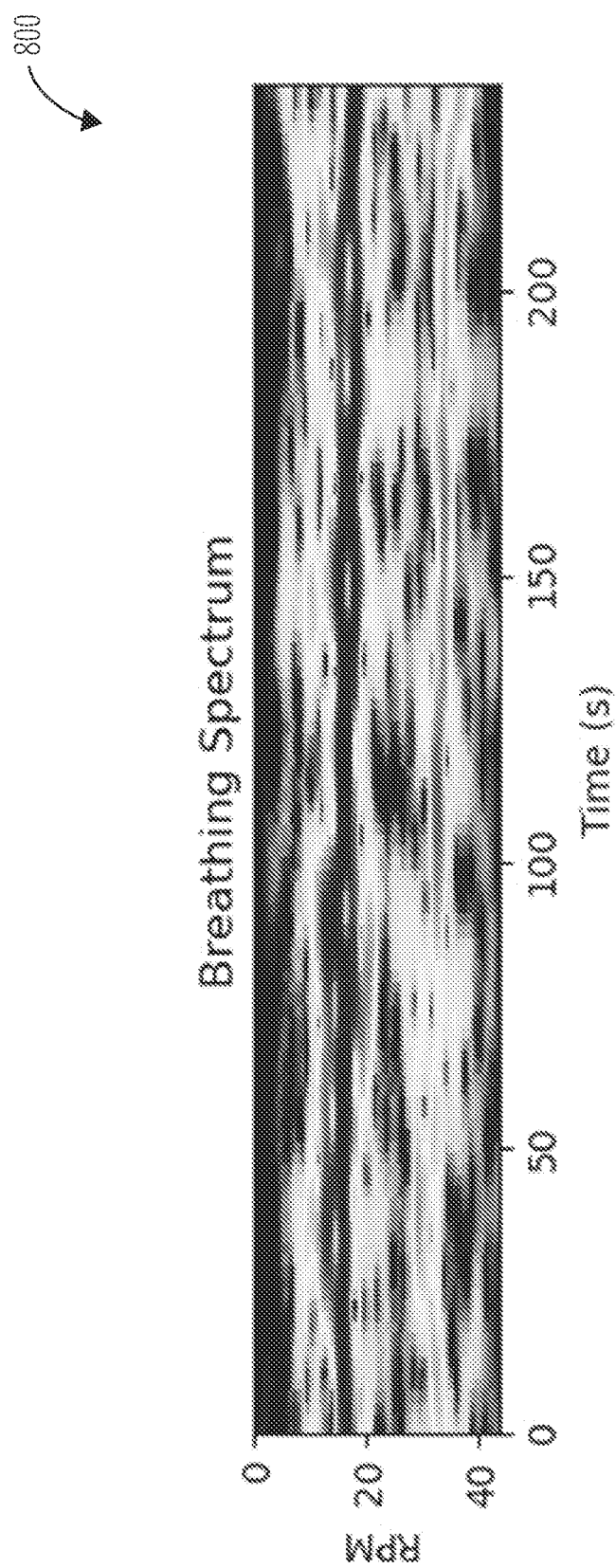
FIG. 8 is a graph illustrating an example breathing spectrum, according to at least one embodiment.

As described above, the processing logic can determine a spectrum of each channel subcarrier at block 406 of FIG. 4. FIG. 8 is a graph 800 illustrating an example breathing spectrum, according to at least one embodiment. The processing logic can use FFT to estimate the spectrum of the CSI amplitude for each channel subcarrier. The processing logic can perform subcarrier selection for respiratory signal boosting. In at least one embodiment, the processing logic can calculate the SNR for each subcarrier and select a K number of channel subcarriers with the highest SNRs, where K is a positive integer greater than one. The processing logic can determine the average of the K subcarrier's spectrum as a combined breathing spectrum, such as the breathing spectrum in graph 800.

Figure 9:
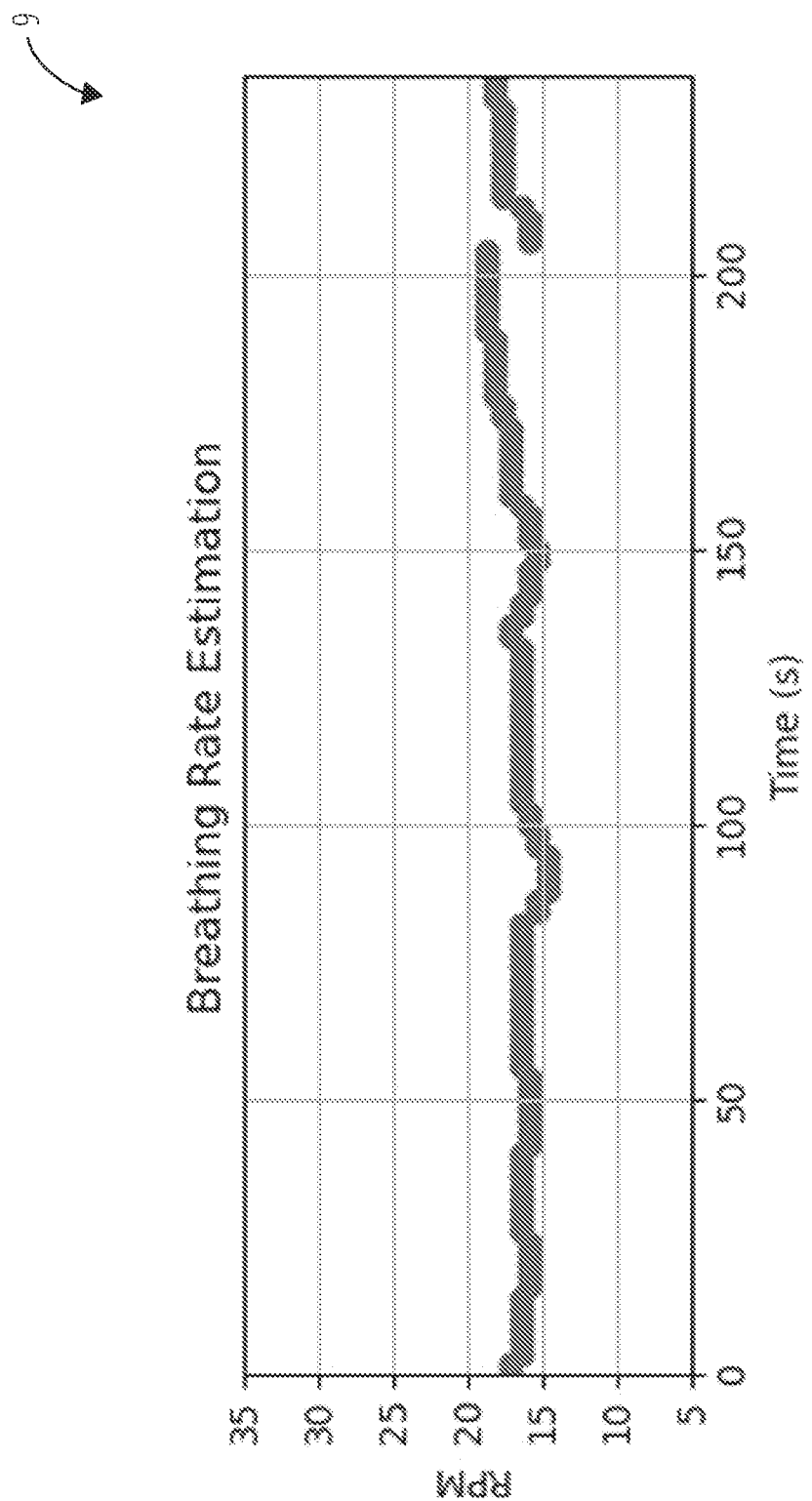
FIG. 9 is a graph illustrating an estimated breathing rate from the breathing spectrum, according to at least one embodiment.

As described above, the processing logic can perform respiratory rate detection and estimation at block 408 of FIG. 4. FIG. 9 is a graph 900 illustrating an estimated breathing rate from the breathing spectrum, according to at least one embodiment. If the energy of the spectrum with high frequencies is larger than a threshold, the processing logic can determine that this is a large motion, such as walking. If a large motion is detected, the respiratory rate detection and estimate should be discarded. The processing logic can estimate the respiratory rate as the frequency with the highest energy in the breathing spectrum. That is, the frequency with the highest energy in the spectrum corresponds to the desired breathing rate.

In other embodiments, the algorithm can include further algorithm refinements. In at least one embodiment, due to the large noise of the measured CSI from lower-cost client devices, the robustness, and accuracy of the proposed sensing system can be increased by: 1) detecting false positives when the environment is static; 2) increasing the sensing coverage for the respiratory monitoring; 3) considering the timestamp of the CSI packets; 4) applying outlier removal filter to filter out the outliers of the respiratory respiration rate estimate; or the like.

Regarding 1), when the environment is static (i.e., empty of moving objects), the CSI data has some internal variations which contain a significant amount of energy in the low frequencies. Even if the estimates are outside the normal breathing range, e.g., from 10 respirations per minute (RPM) (or a number of breaths per minute) to 30 RPM, there are still chances that the dominant frequency falls within the range of respiratory frequencies as shown in FIG. 10A, as compared to when a user is close to the wireless device, as illustrated in FIG. 10B.

Figure 10A:
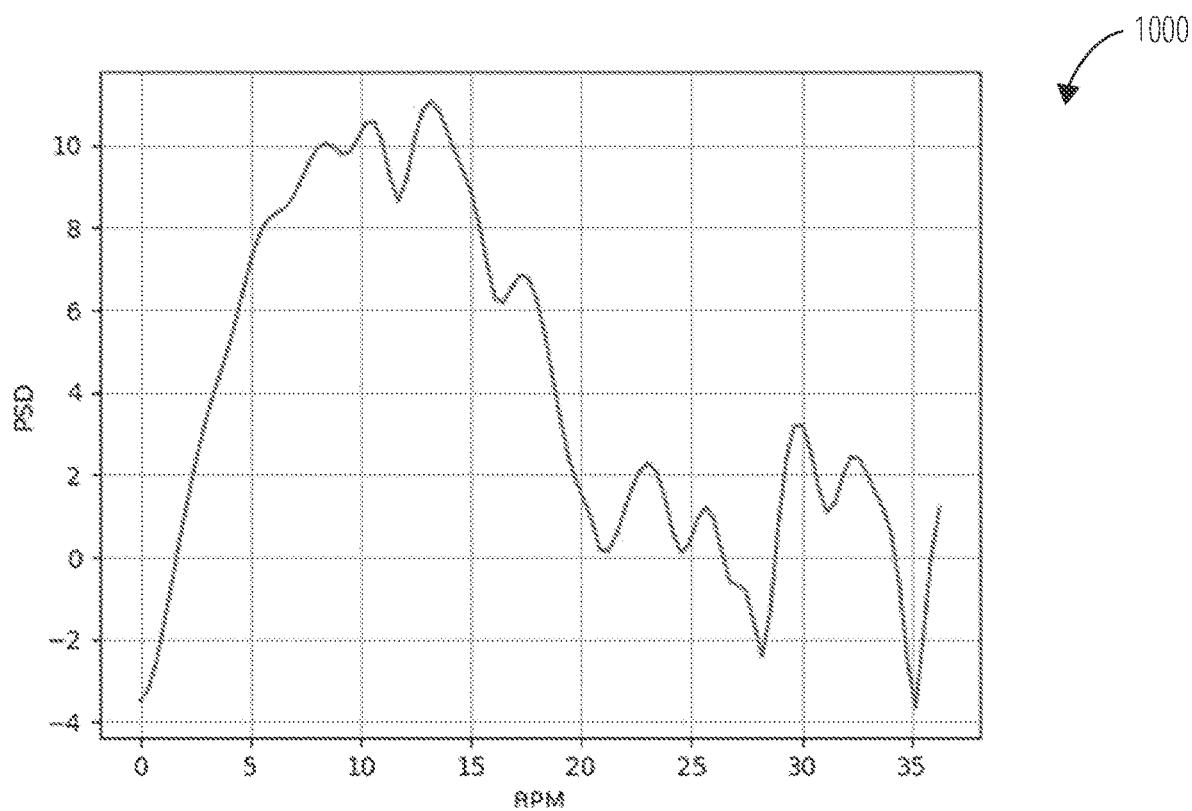
FIG. 10A is a graph illustrating a number of breaths per minute and a power spectral density in an empty environment, according to at least one embodiment.

FIG. 10A is a graph 1000 illustrating a number of breaths per minute and a power spectral density in an empty environment, according to at least one embodiment. As illustrated in graph 1000, there can be a significant amount of energy in the low frequencies or other frequencies outside of a normal breathing rate between 10 to 30 RPM. Since the peak of the spectrum is around 13 RPM and its value exceeds the preset threshold, the breathing estimator would get a false breathing detection.

Figure 10B:
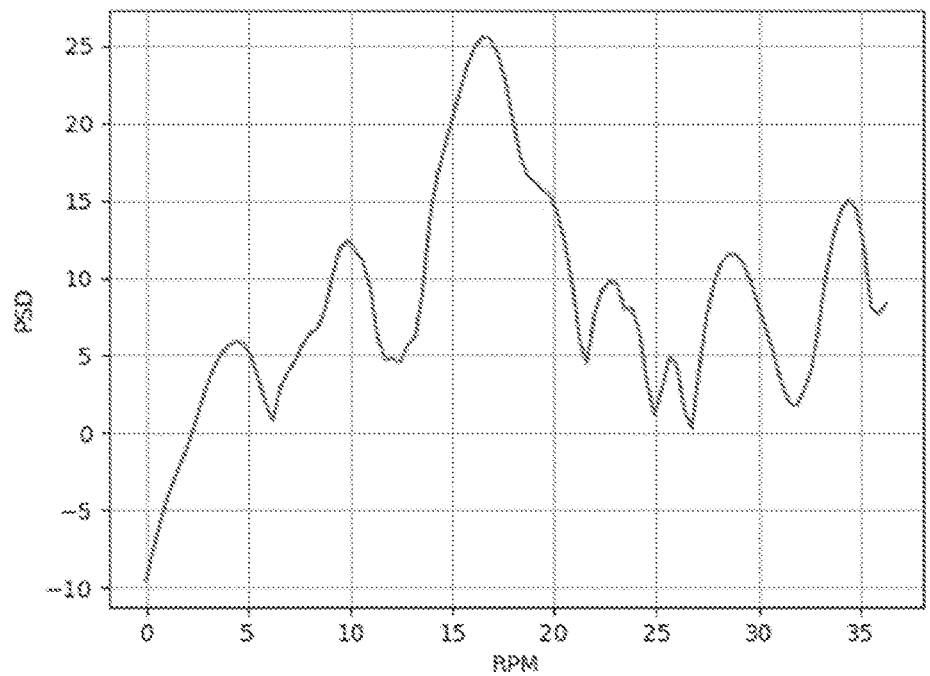
FIG. 10B is a graph illustrating a number of breaths per minute and a power spectral density when a user is close to the wireless device, according to at least one embodiment.

FIG. 10B is a graph 1002 illustrating a number of breaths per minute and a power spectral density when a user is close to the wireless device, according to at least one embodiment. For example, in an example spectrum shown in FIG. 10B, where the user is close to the device, the peak that corresponds to the breathing signal is much narrower compared to the peak where the environment is empty in graph 1000 of FIG. 10A. Therefore, the processing logic can use a peak width as a feature to reduce the false positives for empty environment cases. Specifically, the processing logic can use a 3 dB peak width, which means the length of the interval between the left and right points with 3 dB less energy around the peak location. In at least one embodiment, after the refinement, including the peak width in the detector, the false positive rate drops from 0.5% to 0.06%, as illustrated in FIG. 10C.

Figure 10C:
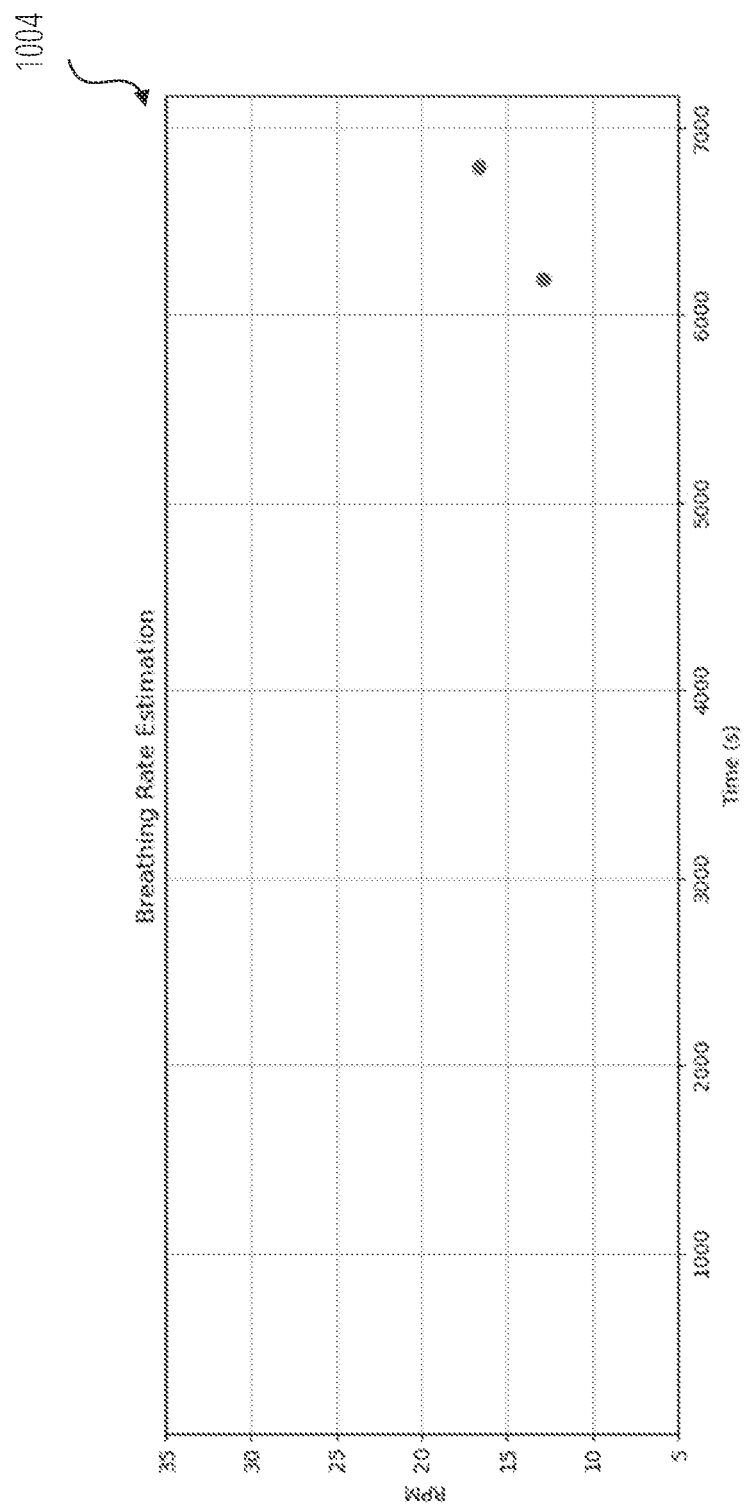
FIG. 10C is a graph illustrating one hour of motion data and empty data, according to at least one embodiment.

FIG. 10C is a graph 1004 illustrating one hour of motion data and empty data, according to at least one embodiment. The first 3600 seconds correspond to no motion data and the latter 3600 seconds are motion data, i.e., the tester keeps walking during this hour. Originally, there are 35 false positives, and after the improvement, only 4 false positives, as shown by the two pairs of points in the graph 1004. After the refinement with including the peak width in the detector, the false positive rate drops from 0.5% to 0.06%, as shown two pairs of points in the graph 1004. Since the data points are very dense, each point as seen in the figure is actually the result of two adjacent points.

Figure 11A:
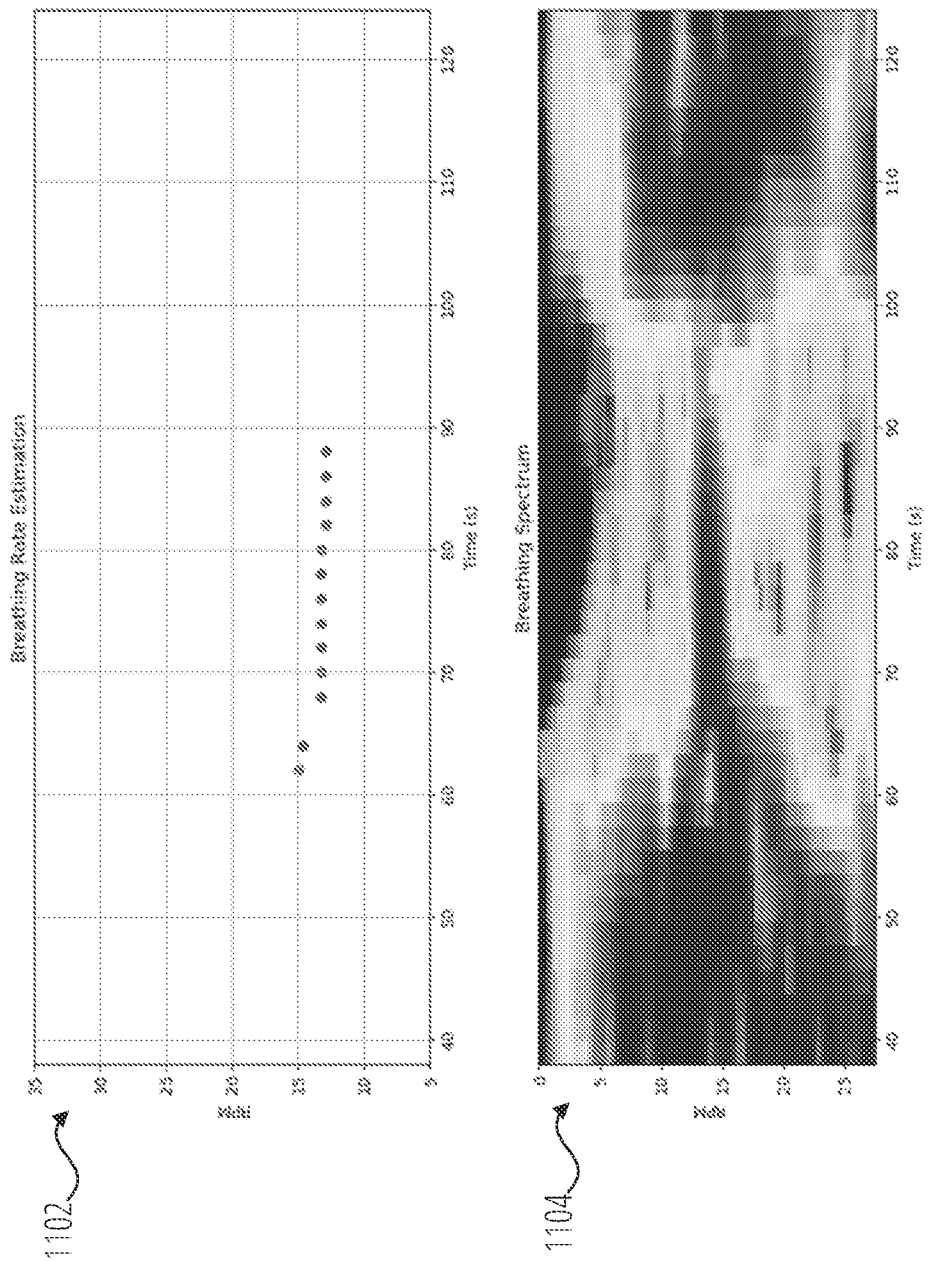
FIG. 11A is a graph illustrating a breathing rate estimation for a breathing spectrum where the selected subcarriers are weighted equally, according to at least one embodiment.
Figure 11B:
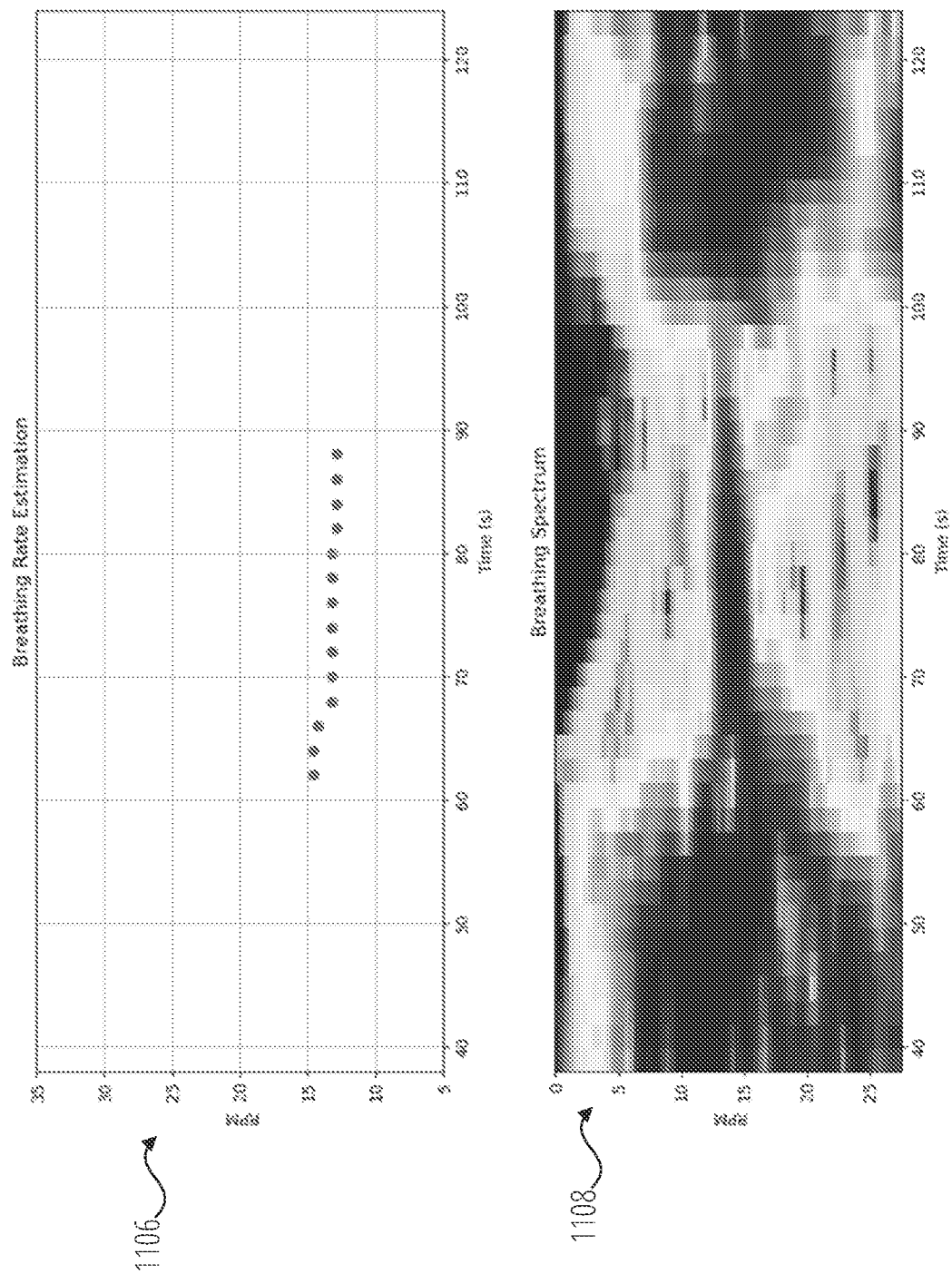
FIG. 11B is a graph illustrating a breathing rate estimation for a breathing spectrum where the selected subcarriers are weighted according to their signal-to-noise ratio (SNR) of the breathing signal, according to at least one embodiment.

Regarding 2) to increase the sensing coverage, the average of the spectrum of the selected subcarriers is considered as the combined spectrum. However, this is not the optimal way to make use of all the information embedded in the subcarriers since each subcarrier is not of equal importance. Instead, the processing logic can use a weighted average scheme to combine the spectrum of the selected subcarriers, and the weight is the SNR of each subcarrier, as illustrated in FIG. 11A and FIG. 11B. This is similar to a maximal ratio combining scheme used for MIMO communication systems.

FIG. 11A is a graph 1102 illustrating a breathing rate estimation for a breathing spectrum 1104 where the selected subcarriers are weighted equally, according to at least one embodiment.

FIG. 11B is a graph 1106 illustrating a breathing rate estimation for a breathing spectrum 1108 where the selected subcarriers are weighted according to their SNR of the breathing signal, according to at least one embodiment. As illustrated in FIG. 11B, the processing logic can boost the SNR of the combined breathing spectrum, resulting in a higher breathing detection rate.

Regarding 3) to improve the accuracy of the respiratory rate estimation by considering the timestamp of the CSI packets, due to RF interference and the internal condition of devices, the CSI packet intervals are not uniform in practice. The actual frame rate is usually smaller than the nominal one, and the estimation of respiratory rate relies heavily on the actual frame rate.

Figure 12A:
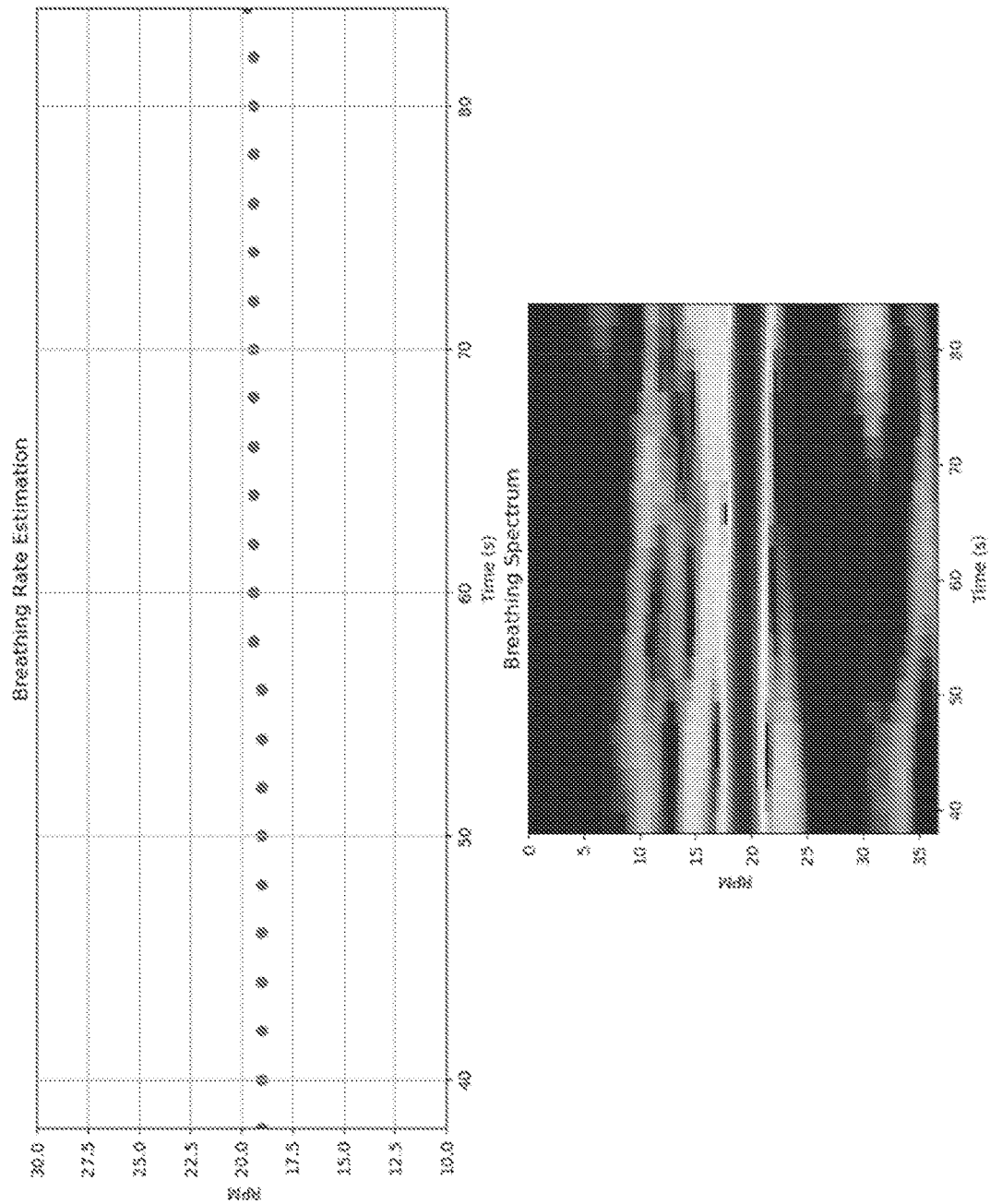
FIG. 12A is a graph illustrating a breathing rate estimation for a breathing spectrum without considering the timestamp of the CSI packets, according to at least one embodiment.

FIG. 12A is a graph illustrating a breathing rate estimation for a breathing spectrum without considering the timestamp of the CSI packets, according to at least one embodiment. Without considering the timestamp, the mean of the estimated respiratory rate is 19.27 RPM (ground truth RPM value is 17 RPM), and the standard deviation is 0.21 RPM.

Figure 12B:
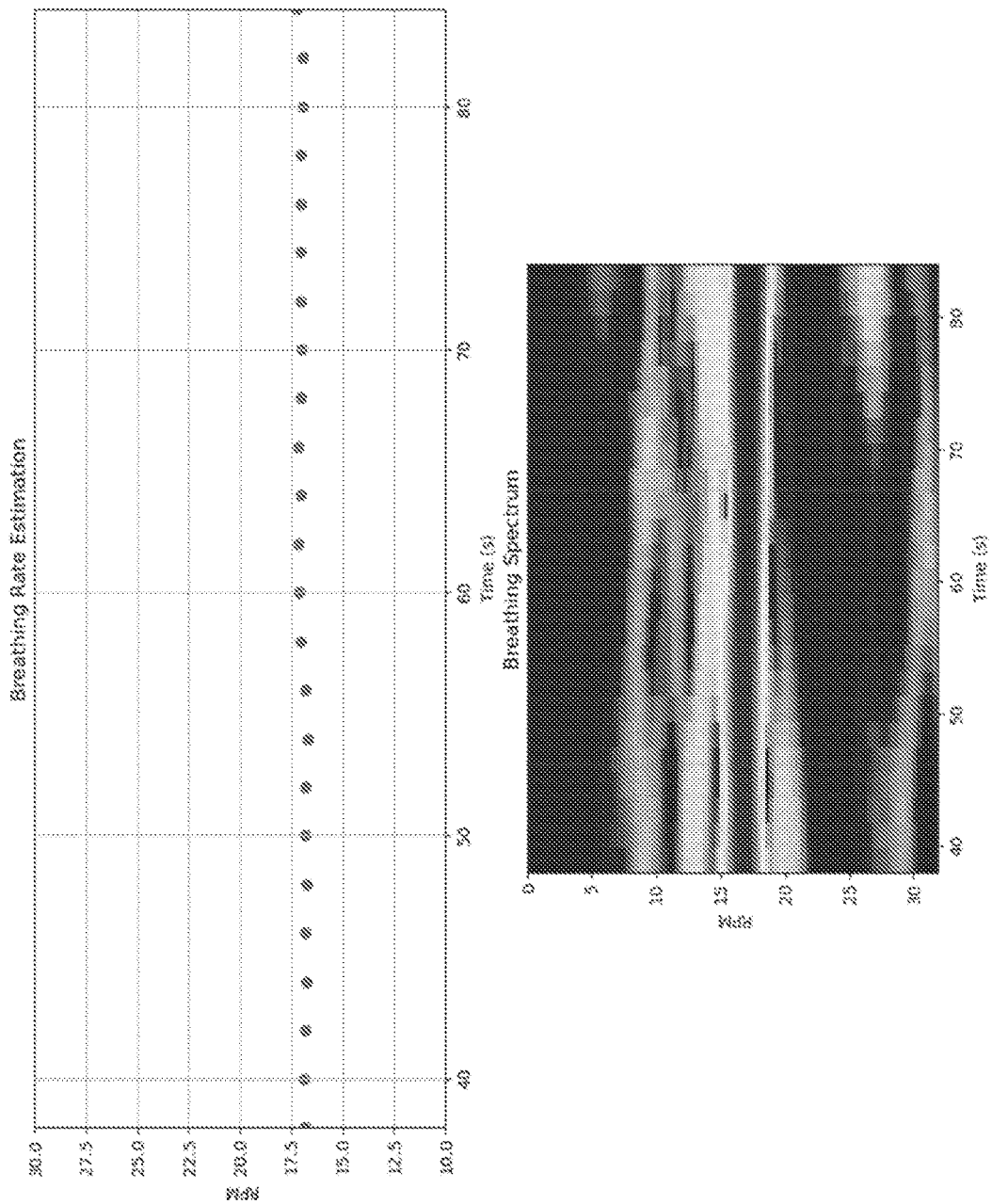
FIG. 12B is a graph illustrating a breathing rate estimation for a breathing spectrum considering the timestamp of the CSI packets, according to at least one embodiment.

FIG. 12B is a graph illustrating a breathing rate estimation for a breathing spectrum considering the timestamp of the CSI packets, according to at least one embodiment. Considering the timestamp, the mean of the estimated respiratory rate is 16.93 RPM (ground truth RPM value is 17 RPM), and the standard deviation is 0.14 RPM.

As shown in FIG. 12A and FIG. 12B, after considering the jitters of timestamp, the error of the respiratory rate estimation reduces from approximately 2.3 RPM to 0.1 RPM. It should be noted that the user breathes according to a metronome, and the preset rate is 17 RPM.

Regarding 4) to apply outlier removal filters to filter out outliers, traditional outlier removal filter is usually for offline processing, and when applied to online data, a very large delay is expected. To reduce the delay, a median filter-based online outlier removal algorithm can be used to remove the outliers, as shown in FIG. 13A and FIG. 13B.

Figure 13A:
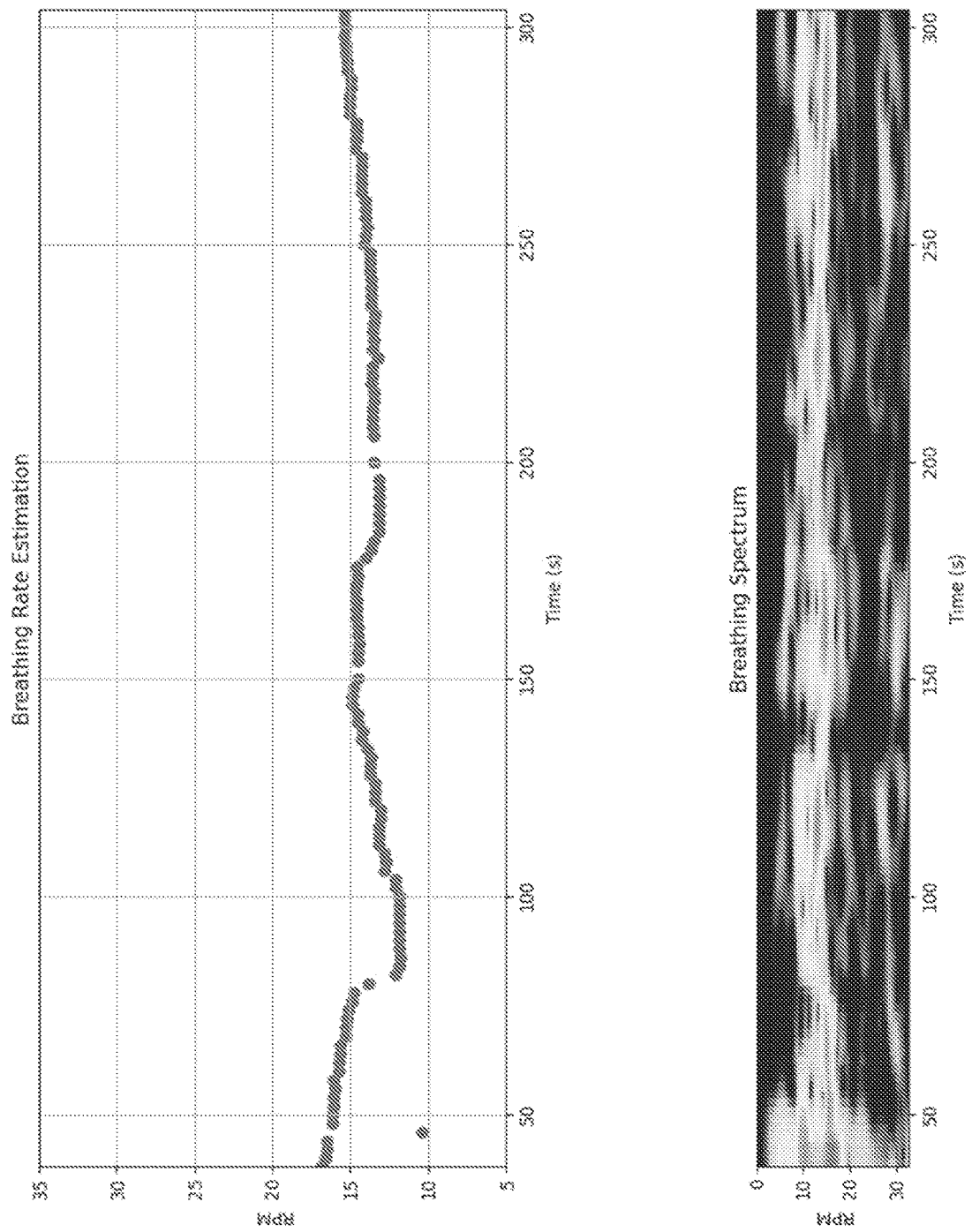
FIG. 13A is a graph illustrating a breathing rate estimation for a breathing spectrum without outlier removal, according to at least one embodiment.

FIG. 13A is a graph illustrating a breathing rate estimation for a breathing spectrum without outlier removal, according to at least one embodiment.

Figure 13B:
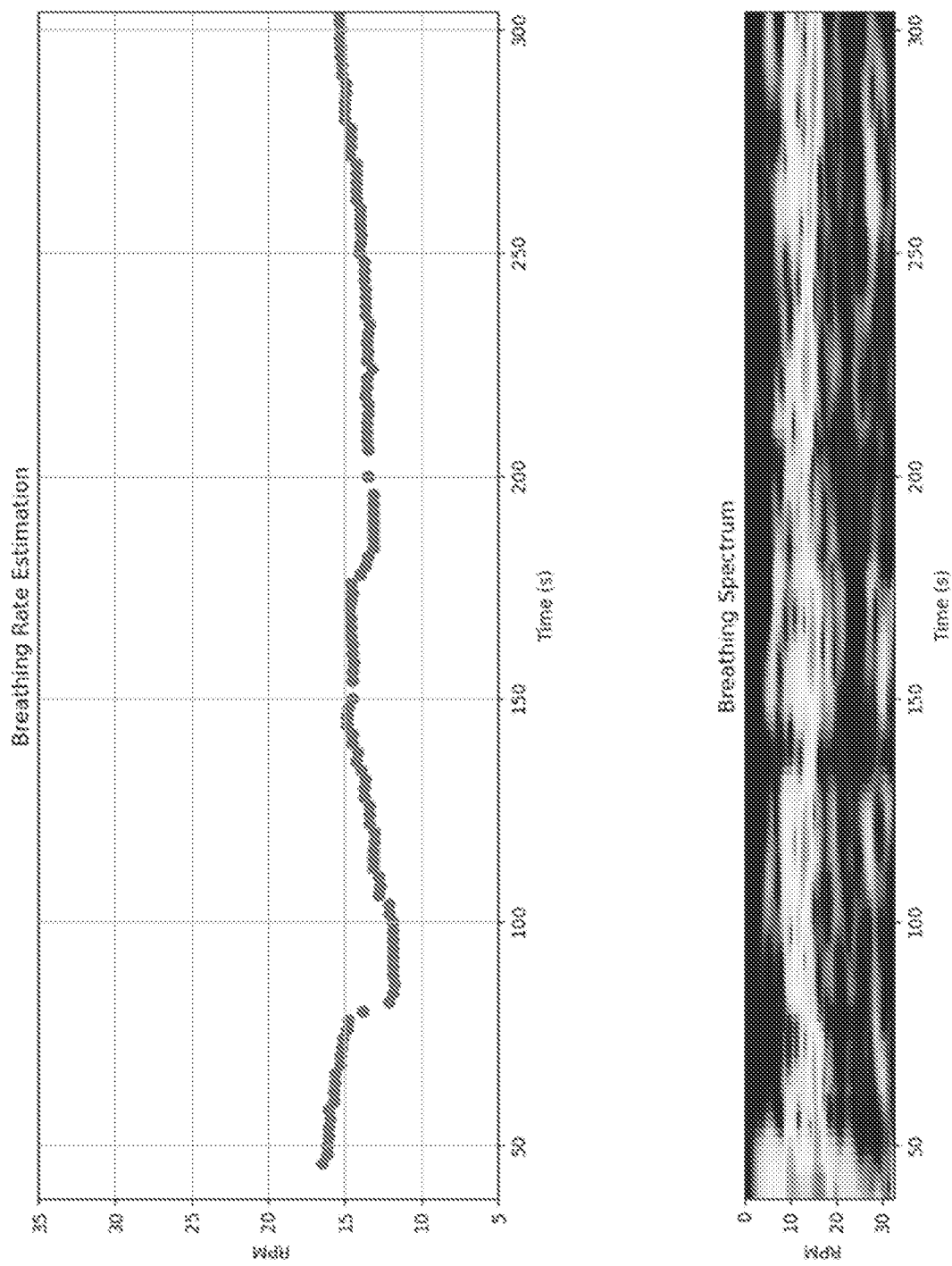
FIG. 13B is a graph illustrating a breathing rate estimation for a breathing spectrum with outlier removal, according to at least one embodiment.

FIG. 13B is a graph illustrating a breathing rate estimation for a breathing spectrum with outlier removal, according to at least one embodiment.

Figure 14:
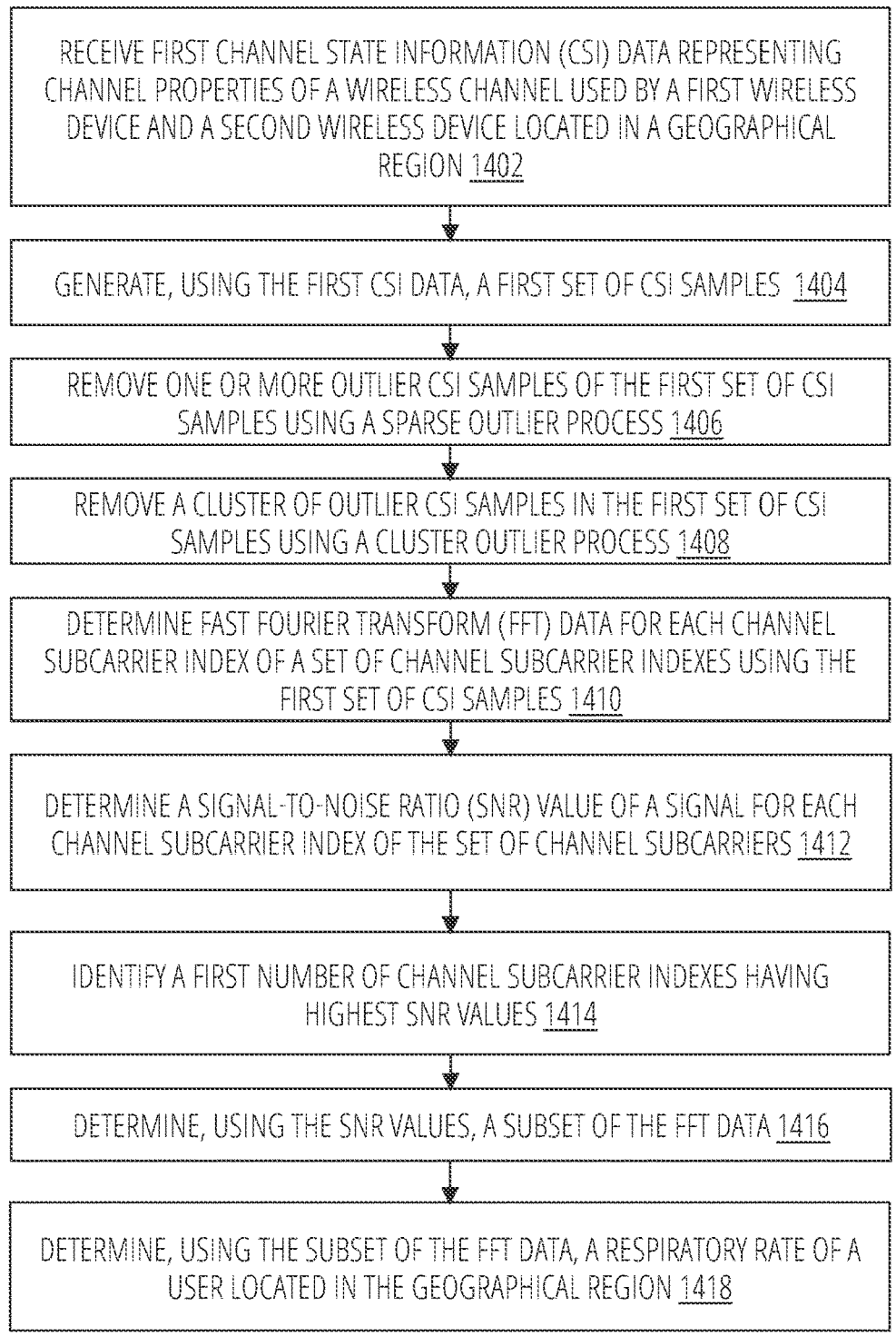
FIG. 14 is a flow diagram of a method 1400 of respiration detection and estimation in the 2.4 GHz band, according to at least one embodiment.

FIG. 14 is a flow diagram of a method 1400 of respiration detection and estimation in the 2.4 GHz band, according to at least one embodiment. The method 1400 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104 of the computing device 150, or the wireless device 120 performs the method 1400. Alternatively, other components of a disclosed device may perform some or all of the operations of the method 1400.

With further reference to FIG. 14, the method 1400 may begin with the processing logic receiving first CSI data representing channel properties of a wireless channel used by a first wireless device and a second wireless device located in a geographical region (block 1402). The first wireless device and the second wireless device operate in a 2.4 GHz band. The first wireless device and the second wireless device operate in other frequency bands as described herein. The processing logic generates, using the first CSI data, a first set of CSI samples (block 1404). The processing logic removes (or adjusts amplitudes of) one or more outlier CSI samples of the first set of CSI samples using a sparse outlier process (block 1406). The processing logic removes a cluster of outlier CSI samples in the first set of CSI samples using a cluster outlier process (block 1408). The processing logic determines FFT data for each channel subcarrier index of a set of channel subcarriers of the wireless channel using the first set of CSI samples (block 1410). The processing logic determines a signal-to-noise ratio (SNR) value of a signal for each channel subcarrier index of the set of channel subcarriers of the wireless channel (block 1412). The processing logic identifies a first number of channel subcarrier indexes having highest SNR values (block 1414). The processing logic determines, using the SNR values, a subset of the FFT data that represents a breathing spectrum (block 1416). In at least one embodiment, the processing logic can choose the top 5 subcarriers for respiration detection and estimation. The processing logic determines, using the subset of the FFT data, a respiratory rate of a user located in the geographical region (block 1418), and the method 1400 ends.

In another embodiment, the processing logic determines a motion condition or a no-motion condition within the geographical region using the set of CSI samples corresponding to the subset of channel subcarrier indexes.

In a further embodiment, the processing logic determines an average of the specified number of channel subcarrier indexes to obtain the breathing spectrum. In another embodiment, the processing logic can determine a weighted average of the channel subcarrier indexes to obtain the breathing spectrum. Other technical features may be readily apparent to one skilled in the art from the following figures, descriptions, and claims.

In a further embodiment, the processing logic adjusts magnitude values of one or more CSI samples of a second set of CSI samples to obtain the first set of CSI samples. The second set of CSI samples include contributions caused by AGC of RF chains of the first wireless device. In at least one embodiment, the first wireless device is an IoT device. Adjusting the one or more magnitude values removes the contributions to the second set of CSI samples caused by the AGC of the RF chain. The processing logic can adjust one or more amplitude values in the second set of CSI samples to remove noise components outside a frequency band of interest.

In a further embodiment, the processing logic, in the sparse outlier process, determines a correlation value between each CSI sample and its neighboring CSI samples in the first set of CSI samples. The processing logic identifies, using a Hampel filter, the one or more CSI samples having a correlation value satisfying a threshold criterion. The processing logic removes or adjusts the one or more CSI samples having the correlation value satisfying the threshold criterion. In another embodiment, the processing logic, to remove the one or more outlier CSI samples, determines a correlation value between each CSI sample and its neighboring CSI samples in the first set of CSI samples. The processing logic determines, using a Hampel filter, that the one or more outlier CSI samples each have a correlation value that satisfies a threshold criterion.

In a further embodiment, the processing logic in the cluster outlier process determines a median amplitude value from the first set of CSI samples. The processing logic calculates a first threshold value. The first threshold value can be used to classify two clusters of distance values. The processing logic determines one or more CSI samples of the first set of CSI samples. Each of the one or more CSI samples has a distance value to the median amplitude value that exceeds the first threshold value. The processing logic determines a score of each of the one or more CSI samples. The processing logic determines a subset of the one or more CSI samples. The score of each CSI sample of the subset exceeds a second threshold value. The processing logic removes the subset of CSI samples from the first set of CSI samples. In another embodiment, to remove the cluster of outlier CSI samples, determines a median CSI value (median amplitude value) from the first set of CSI samples. The processing logic calculates a first threshold value to classify two clusters of distance values. The processing logic classifies each CSI sample of the first set of CSI samples as a candidate outlier responsive to the CSI sample having a distance value to the median CSI exceeding the first threshold value. The processing logic determines a score of a set of the CSI sampling having the distance value to the median CSI exceeding the first threshold value. The processing logic identifies the cluster of outlier CSI samples responsive to the score exceeding a second threshold value.

In a further embodiment, the processing logic estimates baseline CSI data from the first set of CSI samples using a moving average window, and subtracting the baseline CSI data from the first set of CSI samples to magnify embedded CSI dynamics in the first set of CSI samples.

In a further embodiment, the processing logic determines the respiratory rate from the subset of the FFT data representing the breathing spectrum by identifying a frequency with a highest energy in the breathing spectrum. The frequency with the highest energy in the spectrum represents the respiratory rate. The processing logic can also determine a motion condition or a no-motion condition within the geographical region using the set of CSI samples corresponding to the subset of channel subcarrier indexes.

Figure 15:
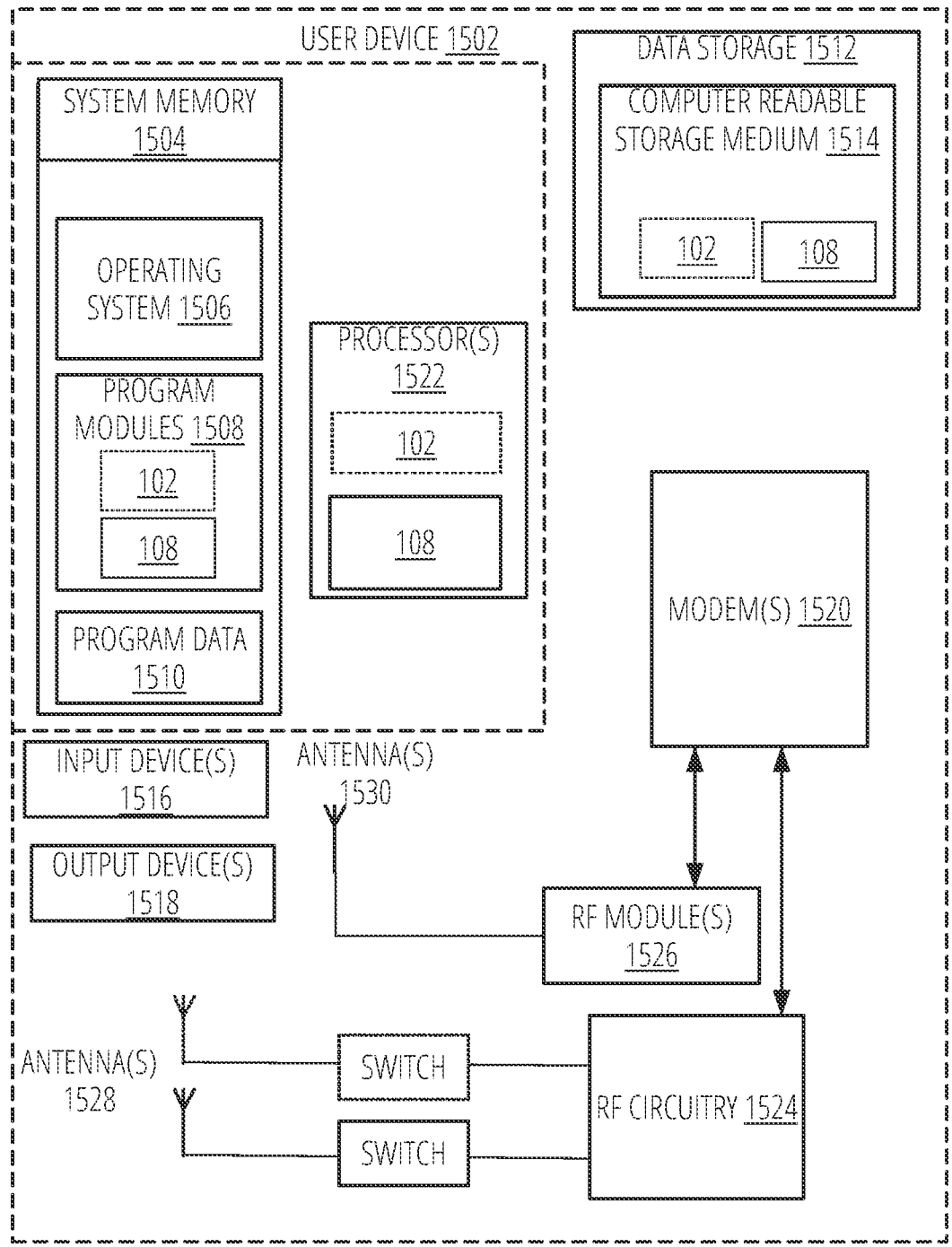
FIG. 15 is a block diagram of a user device in which embodiments of the CSI sensing engine may be implemented.

FIG. 15 is a block diagram of a user device 1502 in which embodiments of the CSI sensing engine 108 may be implemented. The user device 1502 may correspond to the wireless detector 104, the access point device 110, or the wireless device 120 of FIG. 1C. The user device 1502 may be any type of computing devices such as an electronic book reader, a personal digital assistant (PDA), a mobile phone, a laptop computer, a portable media player, a tablet computer, a camera, a video camera, a netbook, a desktop computer, a gaming console, a DVD player, a computing pad, a media center, and the like. The user device 1502 may be any portable or stationary user device. For example, the user device 1502 may be an intelligent voice control and speaker system. Alternatively, the user device 1502 can be any other device used in a WLAN network (e.g., Wi-Fi® network), a WAN network, or the like.

The user device 1502 includes one or more processor(s) 1522, such as one or more central processing units (CPUs), microcontrollers, field-programmable gate arrays, or other types of processors. The user device 1502 also includes system memory 1504, which may correspond to any combination of volatile and/or non-volatile storage mechanisms. The system memory 1504 stores information that provides operating system component 1506, various program modules 1508 (e.g., the CSI sensing engine 108 and ML model 106), program data 1510, and/or other components. In one embodiment, the system memory 1504 stores instructions of the methods as described herein. The user device 1502 performs functions by using the processor(s) 1522 to execute instructions provided by the system memory 1504.

The user device 1502 also includes a data storage device 1512 that may be composed of one or more types of removable storage and/or one or more types of non-removable storage. The data storage device 1512 includes a computer-readable storage medium 1514, on which is stored one or more sets of instructions embodying any of the methodologies or functions described herein. Instructions for the program modules 1508 may reside, completely or at least partially, within the computer-readable storage medium 1514, system memory 1504, and/or within the processor(s) 1522 during execution thereof by the user device 1502, the system memory 1504, and the processor(s) 1522 also constituting computer-readable media. The user device 1502 may also include one or more input device(s) 1516 (keyboard, mouse device, specialized selection keys, etc.) and one or more output device(s) 1518 (displays, printers, audio output mechanisms, etc.).

The user device 1502 further includes a modem(s) 1520 to allow the user device 1502 to communicate via a wireless network (e.g., such as provided by the wireless communication system) with other computing devices, such as remote computers, an item providing system, and so forth. The modem 1520 can be connected to RF circuitry 1524 and zero or more RF module(s) 1526. The RF circuitry 1524 may be a WLAN module, a WAN module, a PAN module, or the like. Antenna(s) 1528 are coupled to the RF circuitry 1524, which is coupled to the modem 1520. Zero or more antenna(s) 1530 can be coupled to one or more RF modules 1526, which are also connected to the modem(s) 1520. The zero or more antennas antenna(s) 1530 may be GPS antennas, Near Field Communication (NFC) antennas, other WAN antennas, WLAN or PAN antennas, or the like. The modem(s) 1520 allows the user device 1502 to handle both voice and non-voice communications (such as communications for text messages, multimedia messages, media downloads, web browsing, etc.) with a wireless communication system. The modem(s) 1520 may provide network connectivity using various types of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE), LTE Advanced (sometimes generally referred to as 4G), 5G, etc., although not all of these mobile network technologies may be available.

The modem(s) 1520 may generate signals and send these signals to antenna(s) 1528 and antenna(s) 1530 via RF circuitry 1524, RF module(s) 1526 as described herein. User device 1502 may additionally include a WLAN module, a GPS receiver, a PAN transceiver, and/or other RF modules. These RF modules may additionally or alternatively be connected to one or more antenna(s) 1528 and antenna(s) 1530. Antenna(s) 1528 and antenna(s) 1530 may be configured to transmit in different frequency bands and/or using different wireless communication protocols. Antenna(s) 1528 and antenna(s) 1530 may be directional, omnidirectional, or non-directional antennas. In addition to sending data, Antenna(s) 1528 and antenna(s) 1530 may also receive data, which is sent to appropriate RF modules connected to the antennas.

In one embodiment, the user device 1502 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band, and the second wireless connection is associated with a second resonant mode of the antenna building that operates at a second frequency band. In another embodiment, the first wireless connection is associated with a first antenna element, and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a GPS application, and so forth.

Though a modem 1520 is shown to control transmission and reception via the antenna (antenna(s) 1528 and antenna(s) 1530), the user device 1502 may alternatively include multiple modems, each of which is configured to transmit/receive data via a different antenna and/or wireless transmission protocol.

The user device 1502 delivers and/or receives items, upgrades, and/or other information via the network. For example, the user device 1502 may download or receive items from an item-providing system. The item-providing system receives various requests, instructions, and other data from the user device 1502 via the network. The item-providing system may include one or more machines (e.g., one or more server computer systems, routers, gateways, etc.) that have processing and storage capabilities to provide the above functionality. Communication between the item-providing system and the user device 1502 may be enabled via any communication infrastructure. One example of such an infrastructure includes a combination of a wide area network (WAN) and wireless infrastructure, which allows a user to use the user device 1502 to purchase items and consume items without being tethered to the item-providing system via hardwired links. The wireless infrastructure may be provided by one or multiple wireless communications systems, such as one or more wireless communications systems. One of the wireless communication systems may be a WLAN hotspot connected to the network. The WLAN hotspots can be created by Wi-Fi® products based on IEEE 802.11x standards by Wi-Fi Alliance. Another one of the wireless communication systems may be a wireless carrier system that can be implemented using various data processing equipment, communication towers, etc. Alternatively, or in addition, the wireless carrier system may rely on satellite technology to exchange information with the user device 1502.

The communication infrastructure may also include a communication-enabling system that serves as an intermediary in passing information between the item-providing and the wireless communication systems. The communication-enabling system may communicate with the wireless communication system (e.g., a wireless carrier) via a dedicated channel and may communicate with the item-providing system via a non-dedicated communication mechanism, e.g., a public WAN such as the Internet.

The user device 1502 is variously configured with different functionality to enable the consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multimedia content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk, including floppy disks, optical disks, CD-ROMs and magnetic-optical disks, read-only memories (ROMs), random access memories (RAMs), Electrically Programmable ROMs (EPROMs), Electrically Erasable Programmable ROMs (EEPROMs), magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear in the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
receiving first channel state information (CSI) data representing channel properties of a wireless channel used by a first wireless device and a second wireless device located in a geographical region;
generating, using the first CSI data, a first set of CSI samples;
removing one or more outlier CSI samples of the first set of CSI samples using a sparse outlier process;
removing a cluster of outlier CSI samples in the first set of CSI samples using a cluster outlier process;
determining Fast Fourier Transform (FFT) data for each channel subcarrier index of a set of channel subcarriers of the wireless channel using the first set of CSI samples;
determining a signal-to-noise ratio (SNR) value of a signal for each channel subcarrier index of the set of channel subcarriers;
identifying a first number of channel subcarrier indexes having highest SNR values;
determining, using the SNR values, a subset of the FFT data; and
determining, using the subset of the FFT data, a respiratory rate of a user located in the geographical region.

2. The method of claim 1, further comprising:
determining an average of the first number of channel subcarrier indexes to obtain the breathing spectrum.

3. The method of claim 1, further comprising:
adjusting magnitude values of one or more CSI samples of a second set of CSI samples to obtain the first set of CSI samples, wherein the second set of CSI samples comprises contributions caused by an automatic gain controller (AGC) of a radio frequency (RF) chain of the first wireless device.

4. The method of claim 1, wherein removing the one or more outlier CSI samples further comprising:
determining a correlation value between each CSI sample and its neighboring CSI samples in the first set of CSI samples; and
determining, using a Hampel filter, that the one or more outlier CSI samples each have a correlation value that satisfies a threshold criterion.

5. The method of claim 1, wherein removing the cluster of outlier CSI samples further comprises:
determining a median amplitude value from the first set of CSI samples;
calculating a first threshold value;
determining one or more CSI samples of the first set of CSI samples, wherein each of the one or more CSI samples has a distance value to the median amplitude value that exceeds the first threshold value;
determining a score of each of the one or more CSI samples;
determining a subset of the one or more CSI samples, wherein the score of each CSI sample of the subset exceeds a second threshold value; and
removing the subset of CSI samples.

6. The method of claim 1, further comprising:
estimating baseline CSI data from the first set of CSI samples using a moving average window, wherein the baseline CSI data represents a static component of the CSI data; and
subtracting the baseline CSI data from the first set of CSI samples.

7. The method of claim 1, wherein determining the respiratory rate from the subset of the FFT data comprises:
identifying a frequency with a highest energy in the breathing spectrum.

8. A first wireless device comprising:
a memory device that stores instructions; and
a processing device, operatively coupled to the memory device, executes the instructions to perform operations comprising:
receive first channel state information (CSI) data representing channel properties of a wireless channel used by the first wireless device and a second wireless device located in a geographical region;
generate, using the first CSI data, a first set of CSI samples;
remove one or more outlier CSI samples of the first set of CSI samples using a sparse outlier process;
remove a cluster of outlier CSI samples in the first set of CSI samples using a cluster outlier process;
determine Fast Fourier Transform (FFT) data for each channel subcarrier index of a set of channel subcarriers of the wireless channel using the first set of CSI samples;
determine a signal-to-noise ratio (SNR) value of a signal for each channel subcarrier index of the set of channel subcarriers;
identify a first number of channel subcarrier indexes having highest SNR values;
determine, using the SNR values, a subset of the FFT data; and
determine, using the subset of the FFT data, a respiratory rate of a user located in the geographical region.

9. The first wireless device of claim 8, wherein the operations further comprising:
determine an average of the first number of channel subcarrier indexes to obtain the breathing spectrum.

10. The first wireless device of claim 8, wherein the operations further comprising:
adjust magnitude values of one or more CSI samples of a second set of CSI samples to obtain the first set of CSI samples, wherein the second set of CSI samples comprises contributions caused by an automatic gain controller (AGC) of a radio frequency (RF) chain of the first wireless device.

11. The first wireless device of claim 8, wherein, to remove the one or more outlier CSI samples, the operations further comprise:
determine a correlation value between each CSI sample and its neighboring CSI samples in the first set of CSI samples; and
identify, using a Hampel filter, the one or more outlier CSI samples each have a correlation value that satisfies a threshold criterion.

12. The first wireless device of claim 8, wherein, to remove the cluster of CSI samples, the operations further comprise:
determine a median amplitude value from the first set of CSI samples;
calculate a first threshold value;
determine one or more CSI samples of the first set of CSI samples, wherein each of the one or more CSI samples has a distance value to the median amplitude value that exceeds the first threshold value;

determine a score of each of the one or more CSI samples;
determine a subset of the one or more CSI samples, wherein the score of each CSI sample of the subset exceeds a second threshold value; and
removing the subset of CSI samples.

13. The first wireless device of claim 8, wherein the operations further comprising:
estimate baseline CSI data from the first set of CSI samples using a moving average window; and
subtract the baseline CSI data from the first set of CSI samples.

14. The first wireless device of claim 8, wherein to determine the respiratory rate from the subset of the FFT data, the operations further comprise:
identify a frequency with a highest energy in the breathing spectrum.

15. A wireless device comprising:
a wireless local area network (WLAN) radio; and
a processing device coupled to the WLAN radio, wherein the processing device is to:
establish a wireless channel with an access point (AP) device;
determine first channel state information (CSI) data representing channel properties of the wireless channel;
generate, using the first CSI data, a first set of CSI samples;
identify one or more outlier CSI samples of the first set of CSI samples using a sparse outlier filter;
remove the one or more outlier CSI samples or adjust amplitudes of the one or more outlier CSI samples;
identify a cluster of outlier CSI samples in the first set of CSI samples using a cluster classification technique;
remove the cluster of outlier CSI samples in the first set of CSI samples;
determine Fast Fourier Transform (FFT) data for each channel subcarrier index of a set of channel subcarriers of the wireless channel using the first set of CSI samples;
determine a signal-to-noise ratio (SNR) value of a signal for each channel subcarrier index of the set of channel subcarriers;
identify a first number of channel subcarrier indexes having highest SNR values;
determine, using the SNR values, a subset of the FFT data; and
determine, using the subset of the FFT data, a respiratory rate of a user located in a geographical region.

16. The wireless device of claim 15, further comprising a radio frequency (RF) chain, wherein the processing device is further to:
adjust magnitude values of one or more CSI samples of a second set of CSI samples to obtain the first set of CSI samples, wherein the second set of CSI samples comprises contributions caused an automatic gain controller (AGC) of the RF chain of the wireless device.

17. The wireless device of claim 15, wherein, to remove the one or more outlier CSI samples, the processing device is further to:
determine a correlation value between each CSI sample and its neighboring CSI samples in the first set of CSI samples; and
identify, using a Hampel filter, that the one or more outlier CSI samples each have a correlation value that satisfies a threshold criterion.

18. The wireless device of claim 15, wherein, to remove the cluster of outlier CSI samples, the processing device is further to:
determine a median amplitude value from the first set of CSI samples;
calculate a first threshold value;
determine one or more CSI samples of the first set of CSI samples, wherein each of the one or more CSI samples has a distance value to the median amplitude value that exceeds the first threshold value
determine a score of each of the one or more CSI samples;
determine a subset of the one or more CSI samples, wherein the score of each CSI sample of the subset exceeds a second threshold value; and
remove the subset of CSI samples.

19. The wireless device of claim 15, wherein the processing device is further to:
estimate baseline CSI data from the first set of CSI samples using a moving average window, wherein the baseline CSI data represents a static component of the CSI data; and
subtract the baseline CSI data from the first set of CSI.

20. The wireless device of claim 15, wherein, to determine the respiratory rate from the subset of the FFT data, the processing device is to:
identify a frequency with a highest energy in the breathing spectrum.

* * * * *